United States Patent
Kim et al.

(10) Patent No.: US 9,910,550 B2
(45) Date of Patent: Mar. 6, 2018

(54) CAPACITIVE-TYPE TOUCH SCREEN SENSOR, TOUCH SCREEN PANEL AND IMAGE DISPLAY DEVICE

(71) Applicant: MIRAENANOTECH CO., LTD., Cheongju (KR)

(72) Inventors: Tae Il Kim, Cheongju (KR); Jae Hun Ye, Cheongju (KR)

(73) Assignee: MIRAENANOTECH CO., LTD., Cheongju (KR)

( * ) Notice: Subject to any disclaimer, the term of this patent is extended or adjusted under 35 U.S.C. 154(b) by 48 days.

(21) Appl. No.: 15/021,252

(22) PCT Filed: Sep. 5, 2014

(86) PCT No.: PCT/KR2014/008435
§ 371 (c)(1),
(2) Date: Mar. 10, 2016

(87) PCT Pub. No.: WO2015/037898
PCT Pub. Date: Mar. 19, 2015

(65) Prior Publication Data
US 2016/0224181 A1    Aug. 4, 2016

(30) Foreign Application Priority Data

Sep. 10, 2013  (KR) .................. 10-2013-0108712
Jan. 24, 2014  (KR) .................. 10-2014-0009112

(51) Int. Cl.
*G06F 3/044*  (2006.01)
*G02F 1/1333* (2006.01)

(52) U.S. Cl.
CPC .......... *G06F 3/044* (2013.01); *G02F 1/13338* (2013.01); *G06F 2203/04111* (2013.01); *G06F 2203/04112* (2013.01)

(58) Field of Classification Search
CPC .......... G06F 3/041–3/048; G06F 2203/04111; G06F 2203/04112; G06F 3/044
See application file for complete search history.

(56) References Cited

U.S. PATENT DOCUMENTS

2007/0229470 A1* 10/2007 Snyder .................... G06F 3/011
                                                    345/173
2009/0085885 A1*  4/2009 Wu ......................... G06F 3/041
                                                    345/173
(Continued)

FOREIGN PATENT DOCUMENTS

KR    10-2010-0084263 A    7/2010
KR    10-2013-0072635 A    7/2013
(Continued)

OTHER PUBLICATIONS

International Search Report for International Patent Application No. PCT/KR2014/008435 filed on Sep. 5, 2014.

*Primary Examiner* — Sanjiv D Patel

(57) ABSTRACT

Disclosed is a touch screen panel. According to one embodiment of the present invention, the touch screen panel comprises a first sensor layer including a plurality of first sensor electrodes for detecting a position of a touch input on one axis and a second sensor layer stacked on an upper or lower part of the first sensor layer and including a plurality of second sensor electrodes for detecting a position of the touch input on another axis. In this case, each of the first sensor electrodes includes first detection regions arranged in a zigzag manner along a first direction and first connection regions for connecting the first detection regions, and each of the second sensor electrodes includes second detection regions arranged in a zigzag manner along a second direction and second connection regions for connecting the second detection regions.

25 Claims, 23 Drawing Sheets

(56) References Cited

U.S. PATENT DOCUMENTS

| | | | | |
|---|---|---|---|---|
| 2010/0060602 A1* | 3/2010 | Agari | .................... | G06F 3/044 345/173 |
| 2010/0164889 A1* | 7/2010 | Hristov | ................ | G06F 3/0416 345/173 |
| 2011/0007030 A1* | 1/2011 | Mo | ........................ | G06F 3/044 345/174 |
| 2011/0148781 A1* | 6/2011 | Chen | .................... | G06F 3/0412 345/173 |
| 2013/0162549 A1* | 6/2013 | Kim | .................... | G06F 3/0412 345/173 |
| 2013/0257774 A1* | 10/2013 | Kim | .................. | H01L 27/1259 345/173 |
| 2013/0335355 A1* | 12/2013 | Ding | .................... | G06F 3/0416 345/173 |

FOREIGN PATENT DOCUMENTS

| | | |
|---|---|---|
| KR | 10-2013-0086875 A | 8/2013 |
| KR | 10-2013-0091518 A | 8/2013 |
| WO | WO 2012/169848 A2 | 12/2012 |

\* cited by examiner

[Fig. 1a]
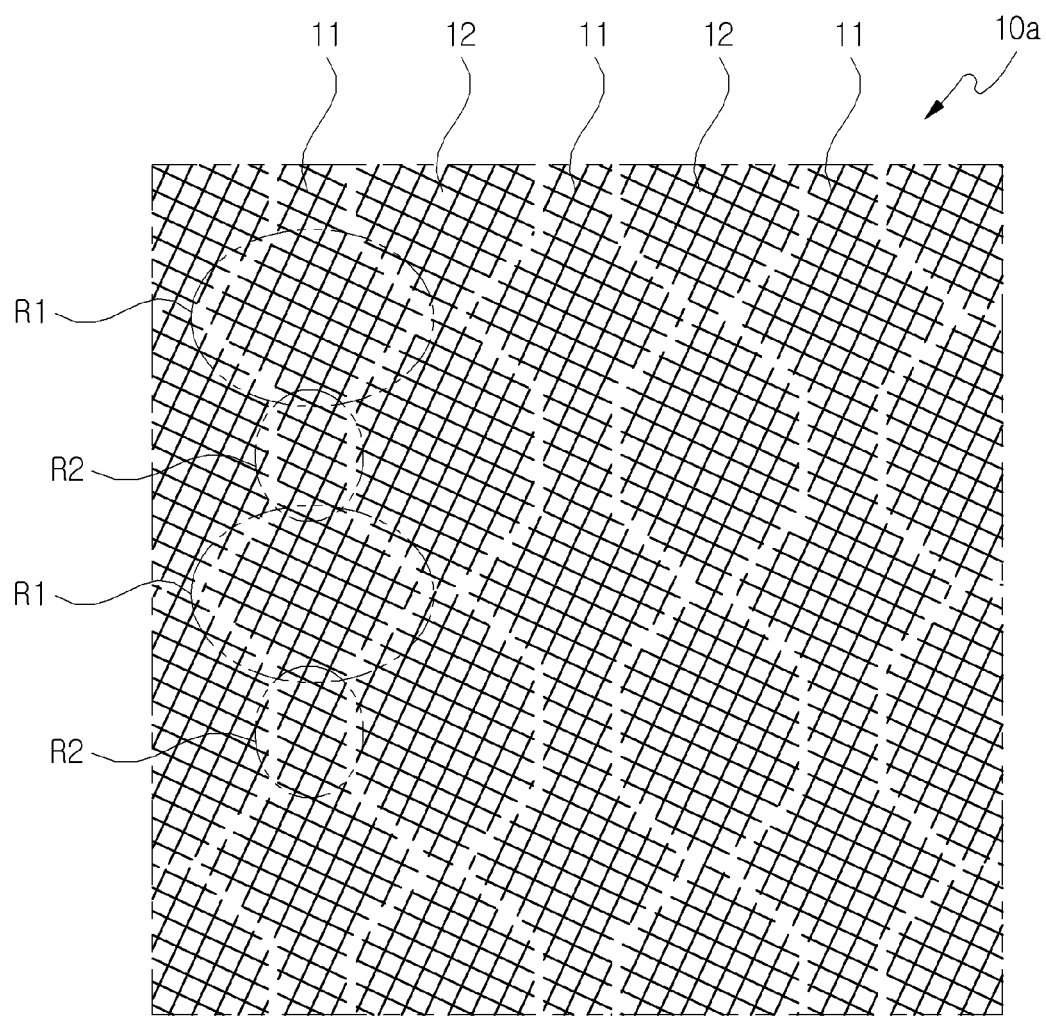

[Fig. 1b]
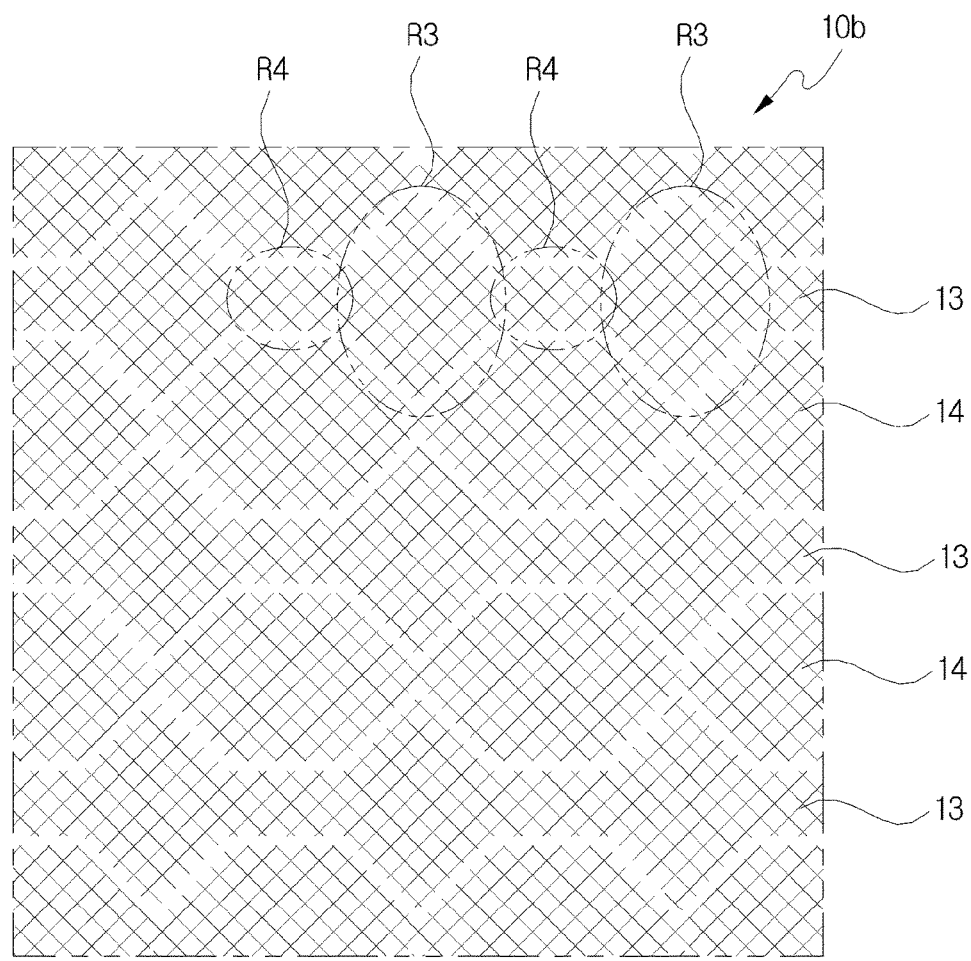

[Fig. 1c]
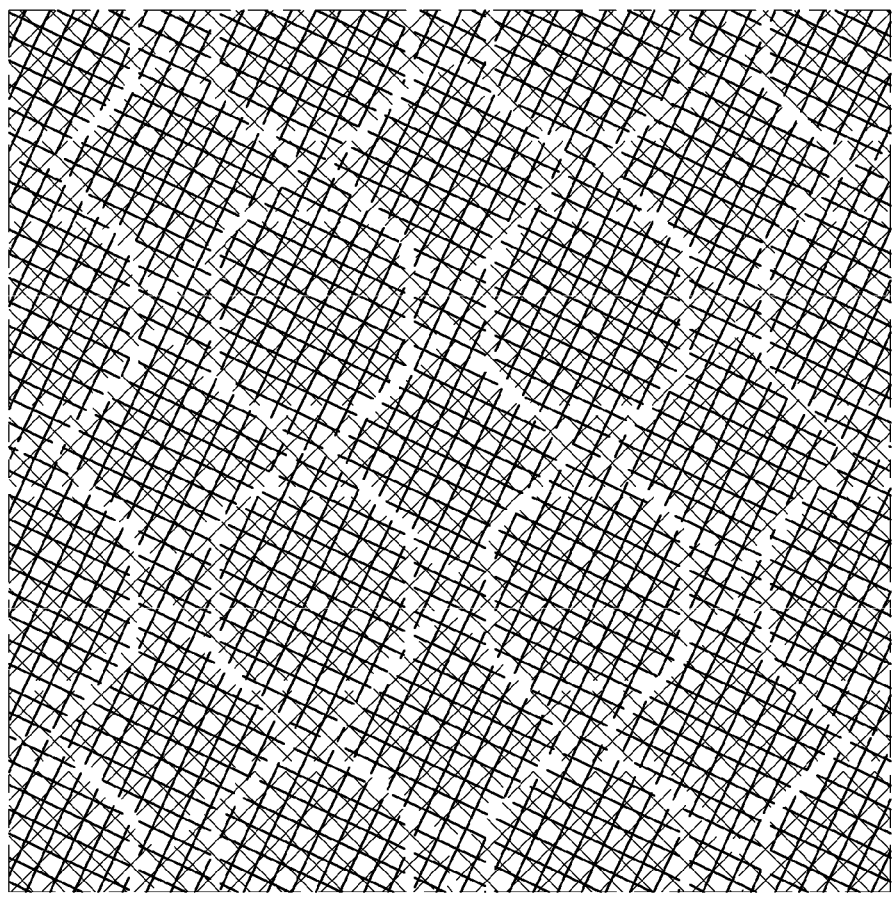

[Fig. 2a]
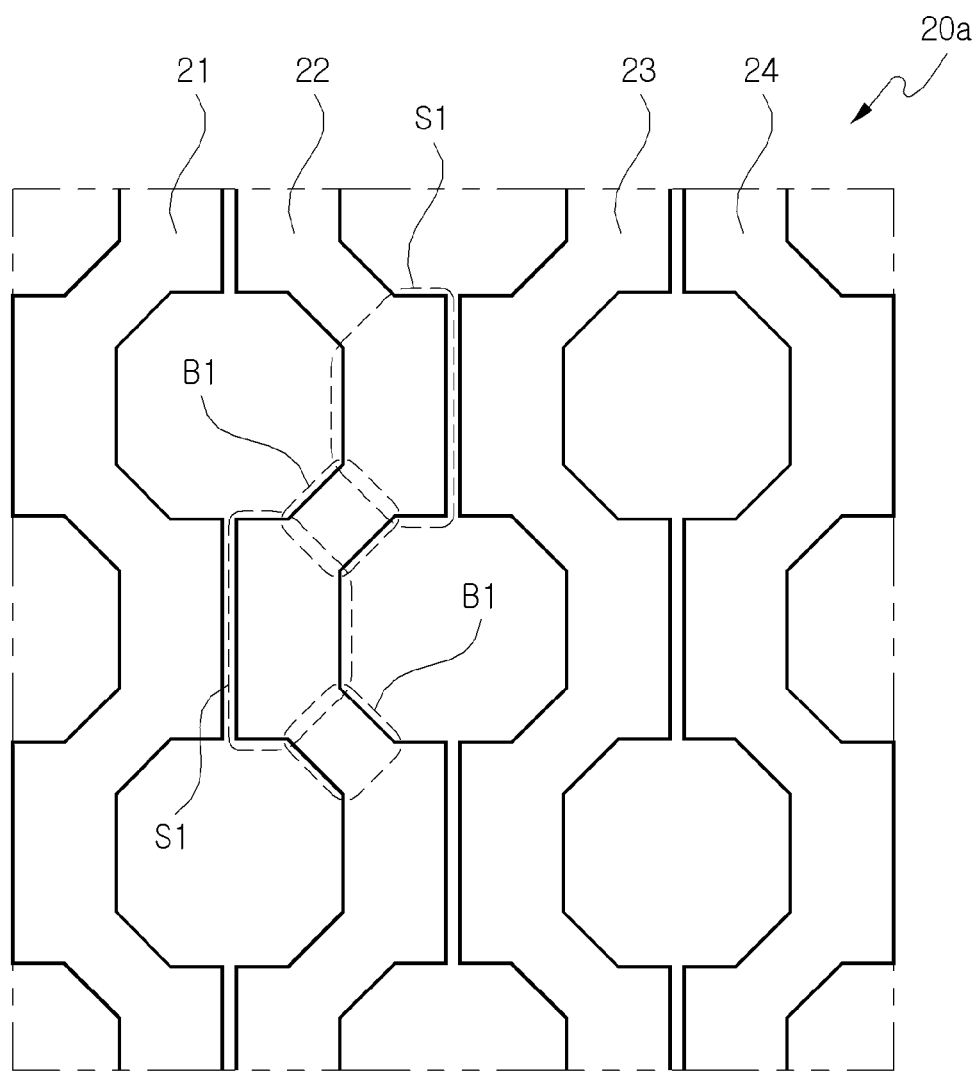

[Fig. 2b]
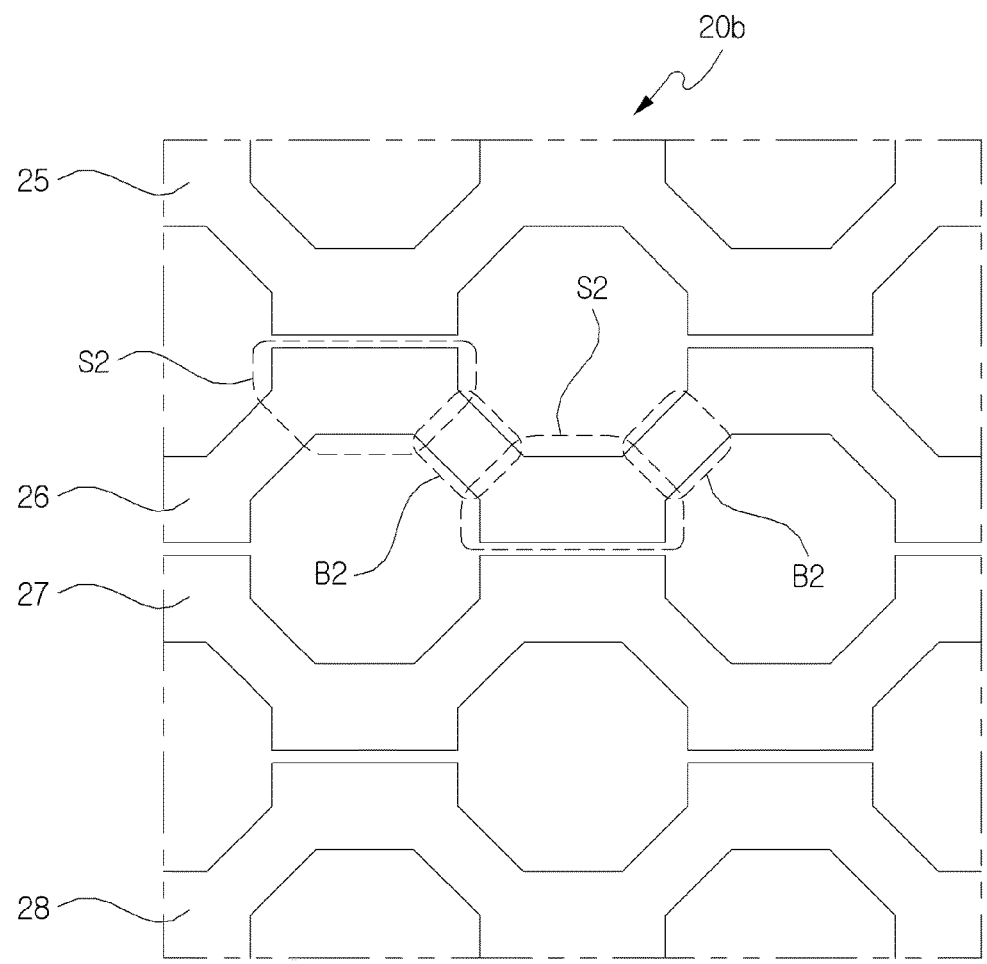

[Fig. 2c]
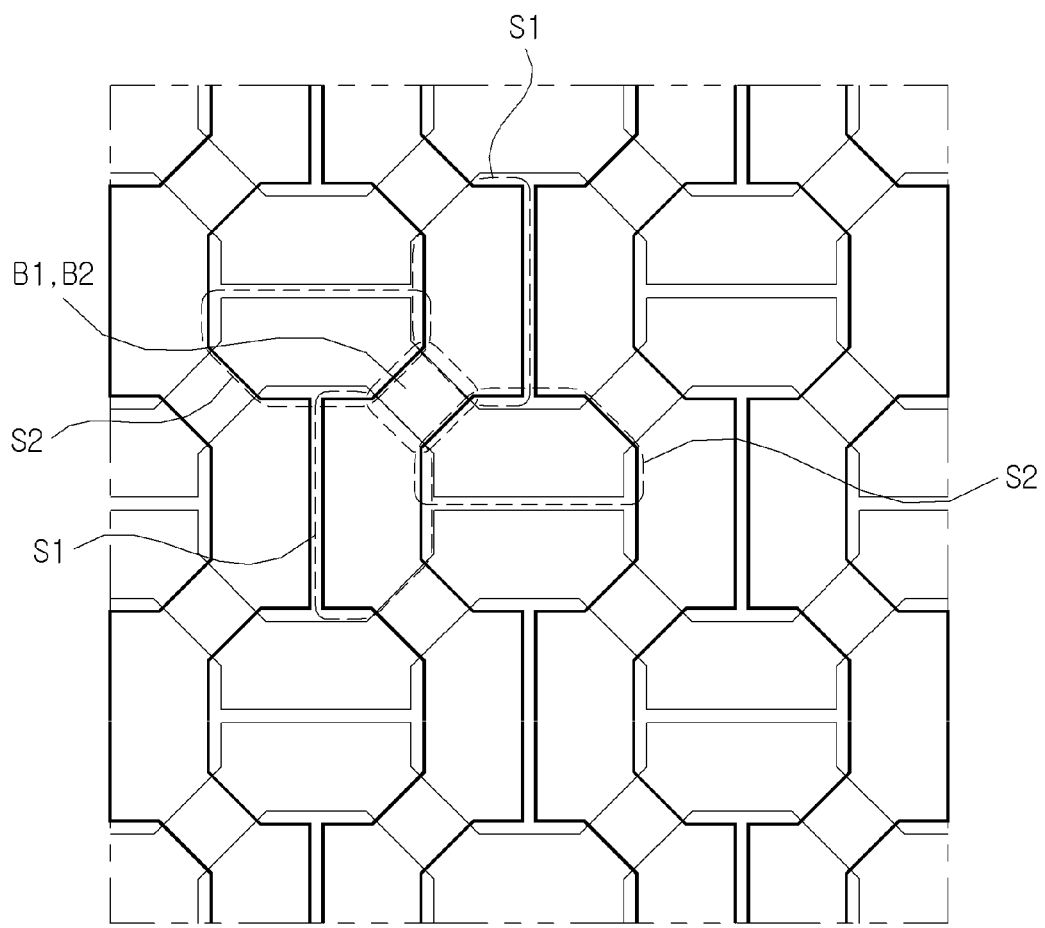

[Fig. 3a]
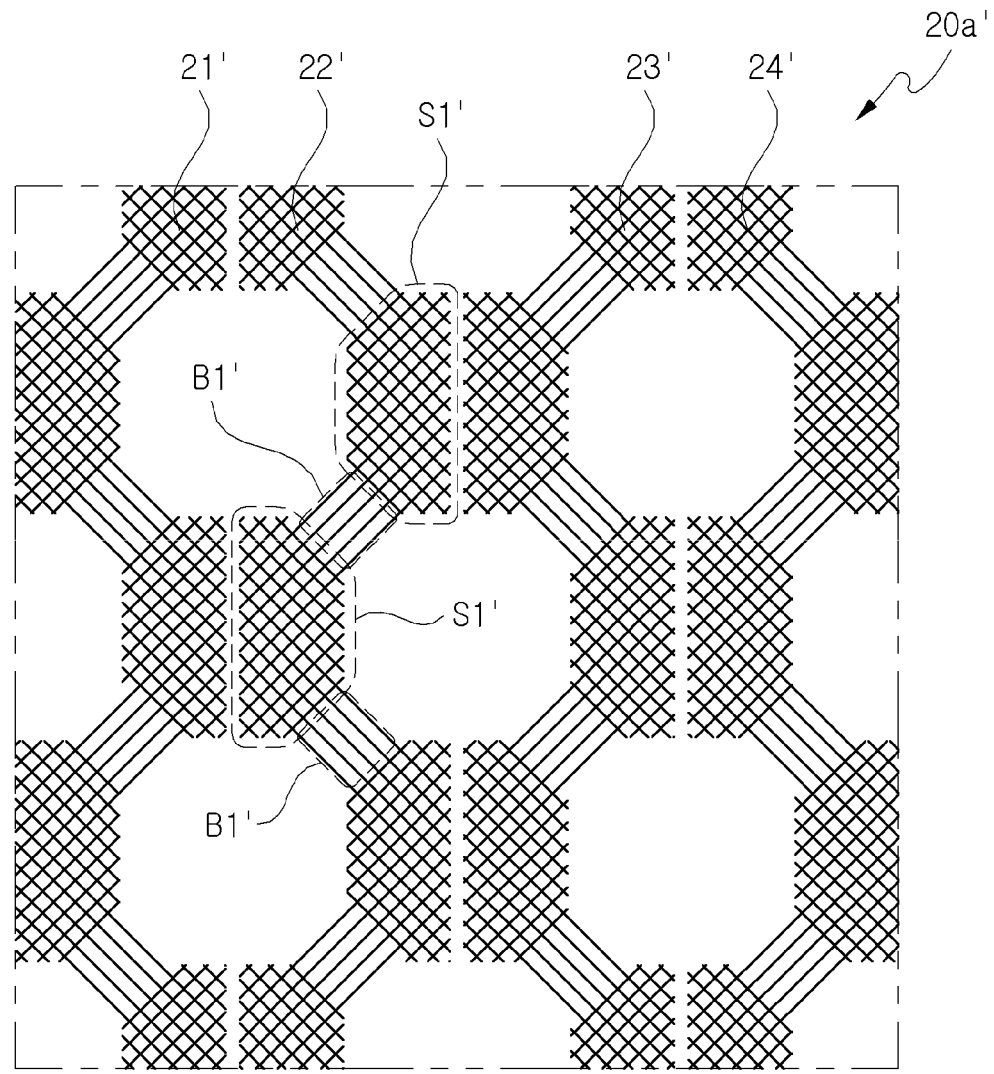

[Fig. 3b]
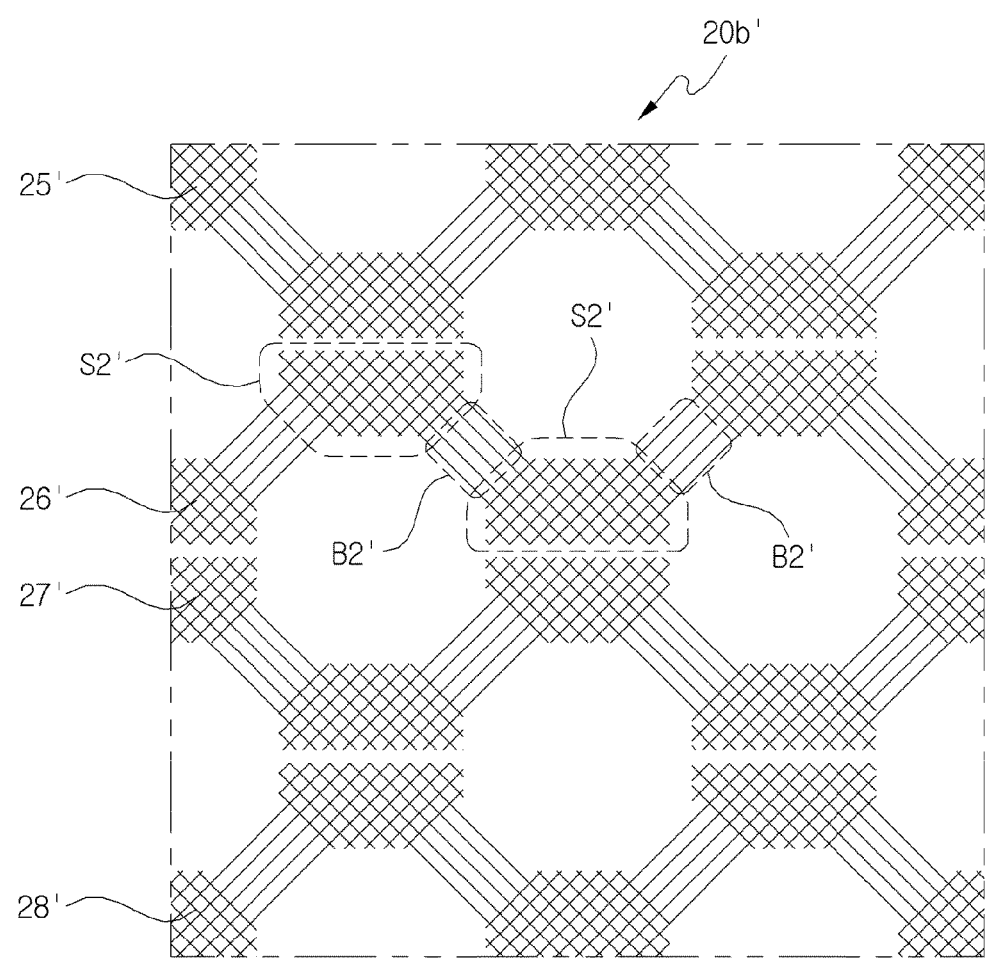

[Fig. 3c]
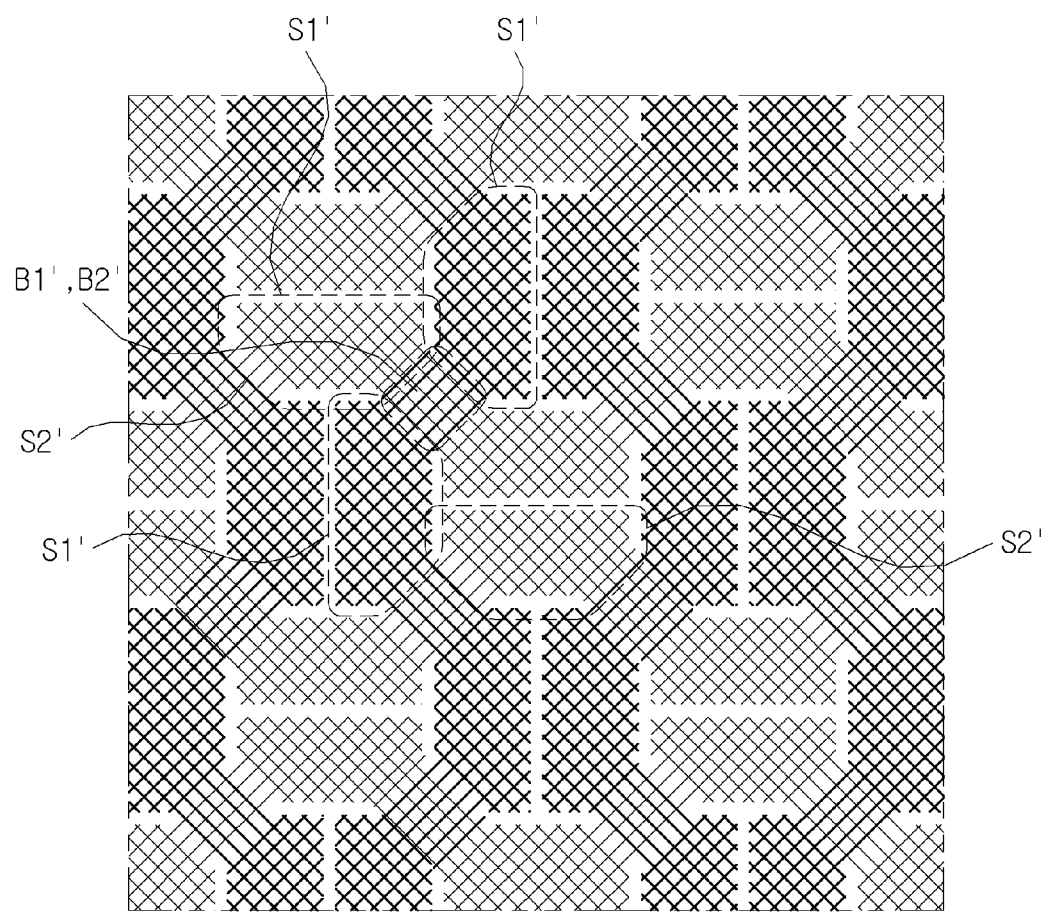

[Fig. 4a]
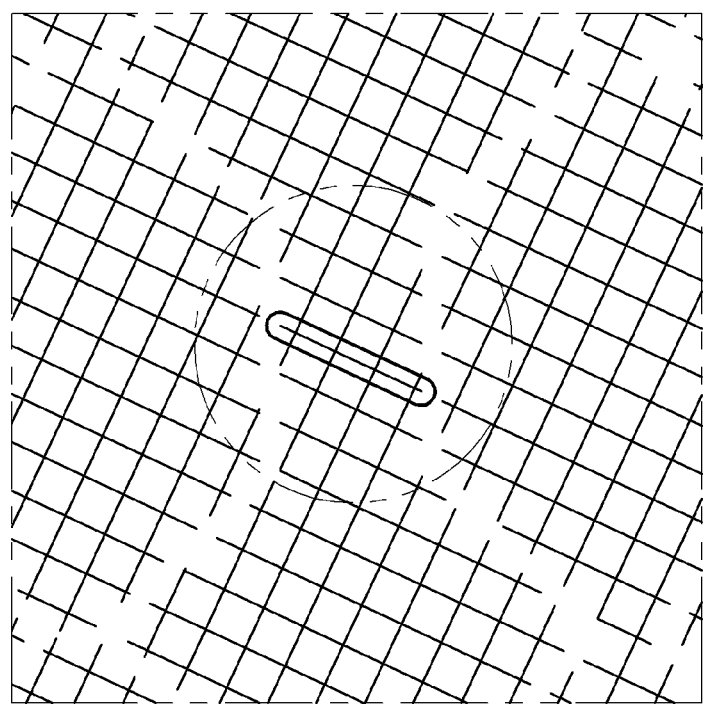

[Fig. 4b]
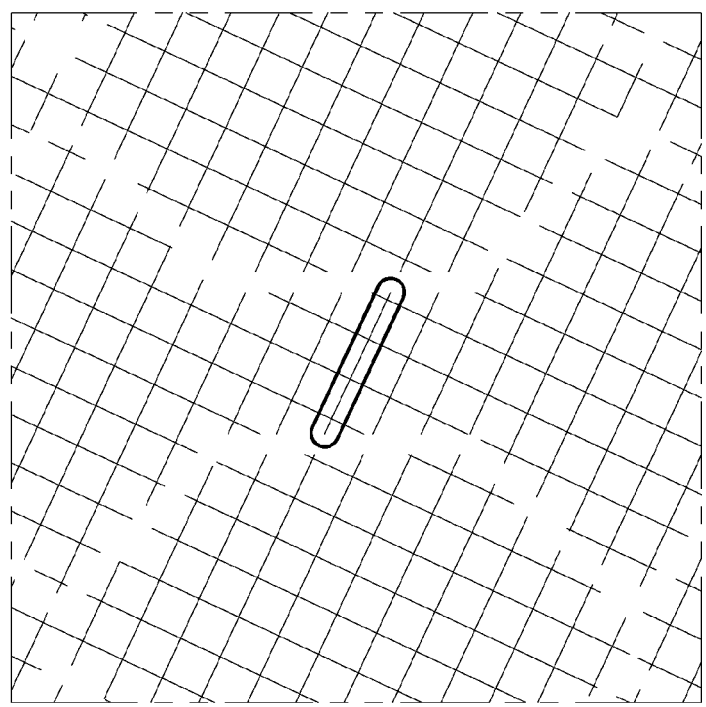

[Fig. 5a]
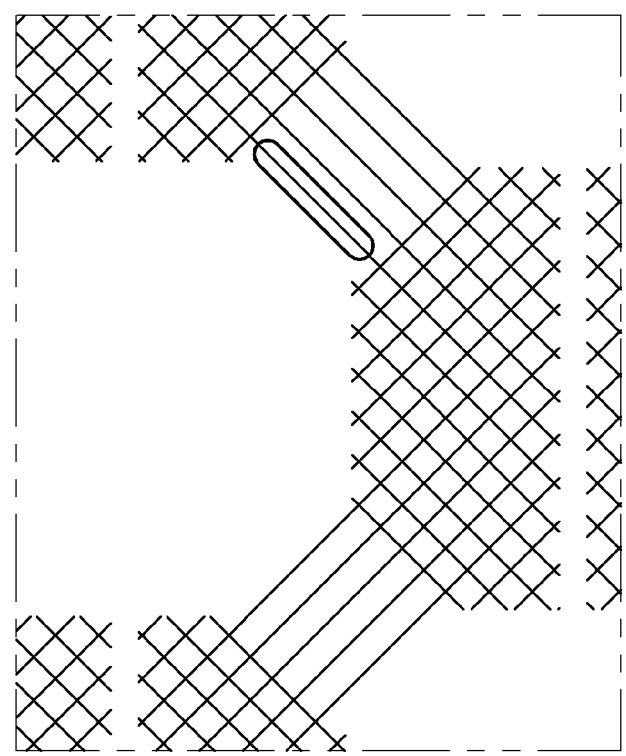

[Fig. 5b]
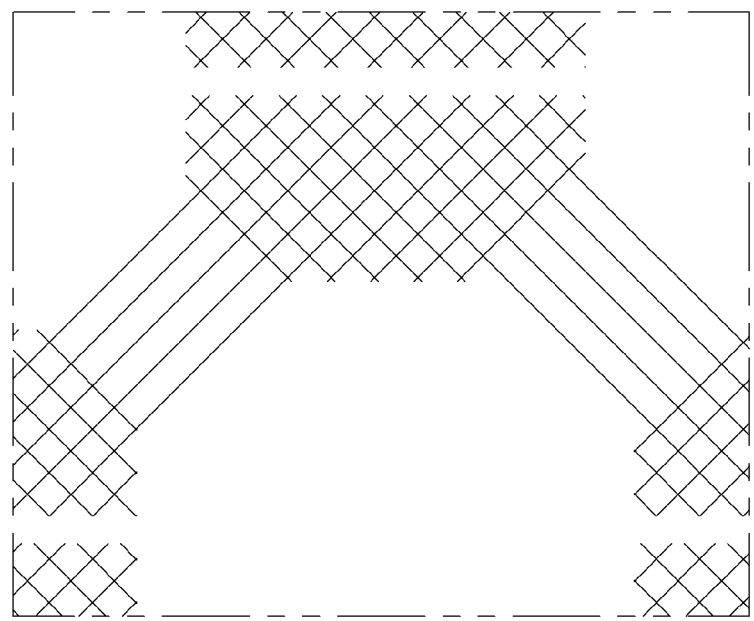
[Fig. 5c]
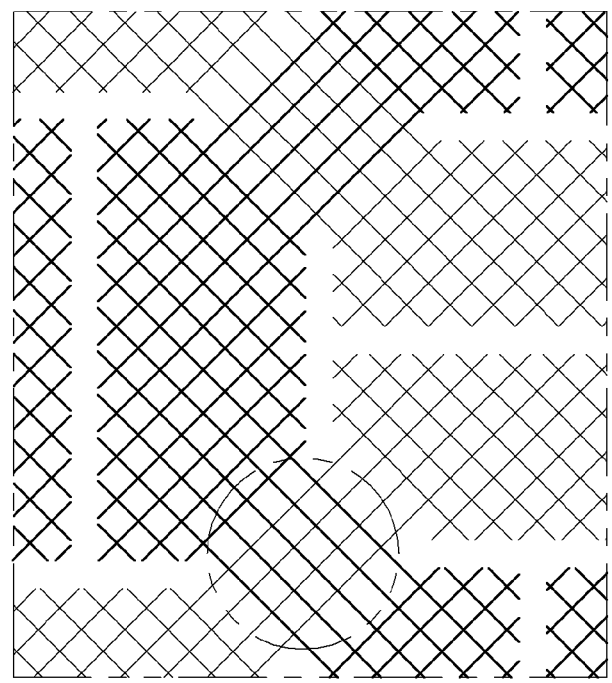

[Fig. 6]
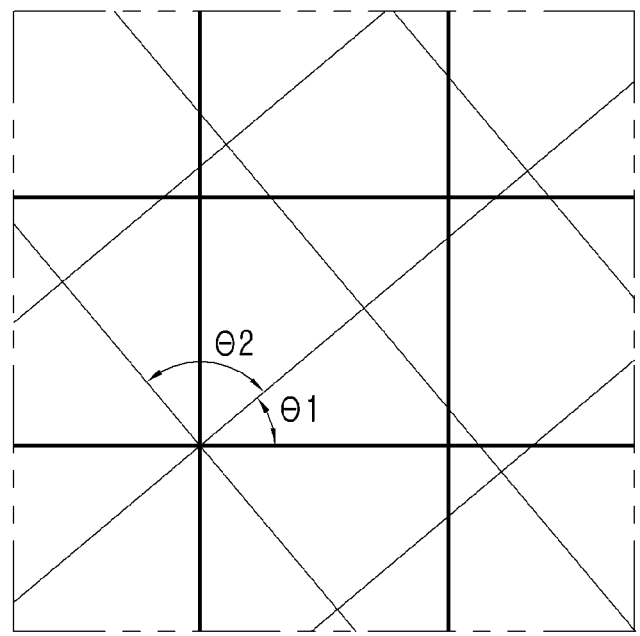
[Fig. 7]
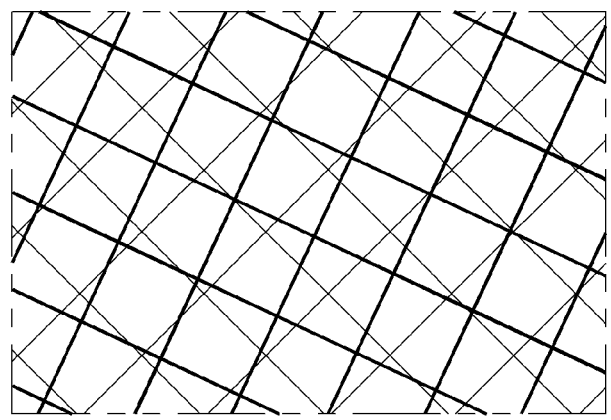

[Fig. 8]
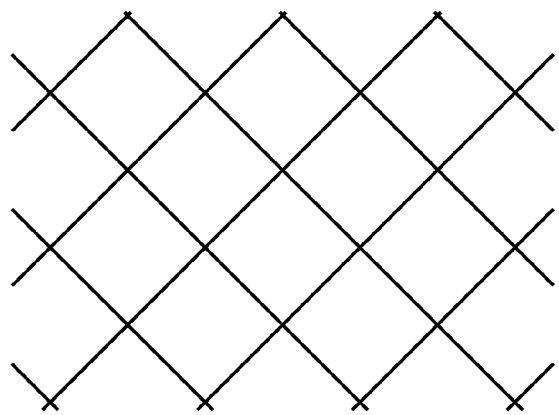

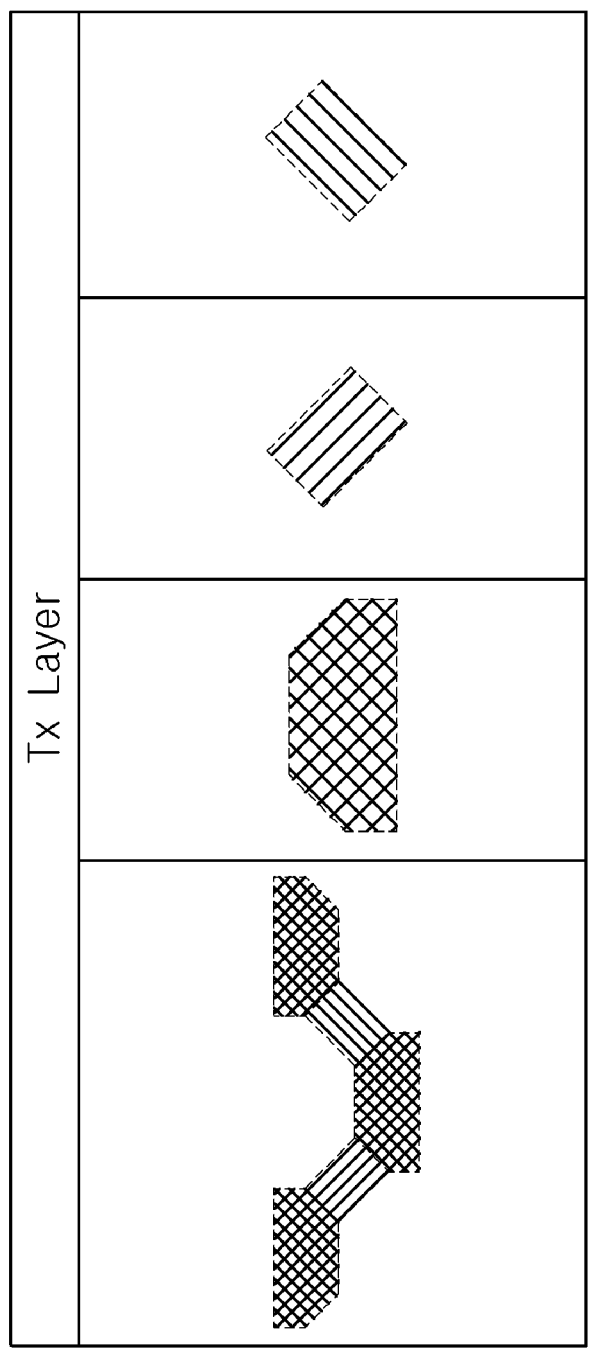
[Fig. 9a]

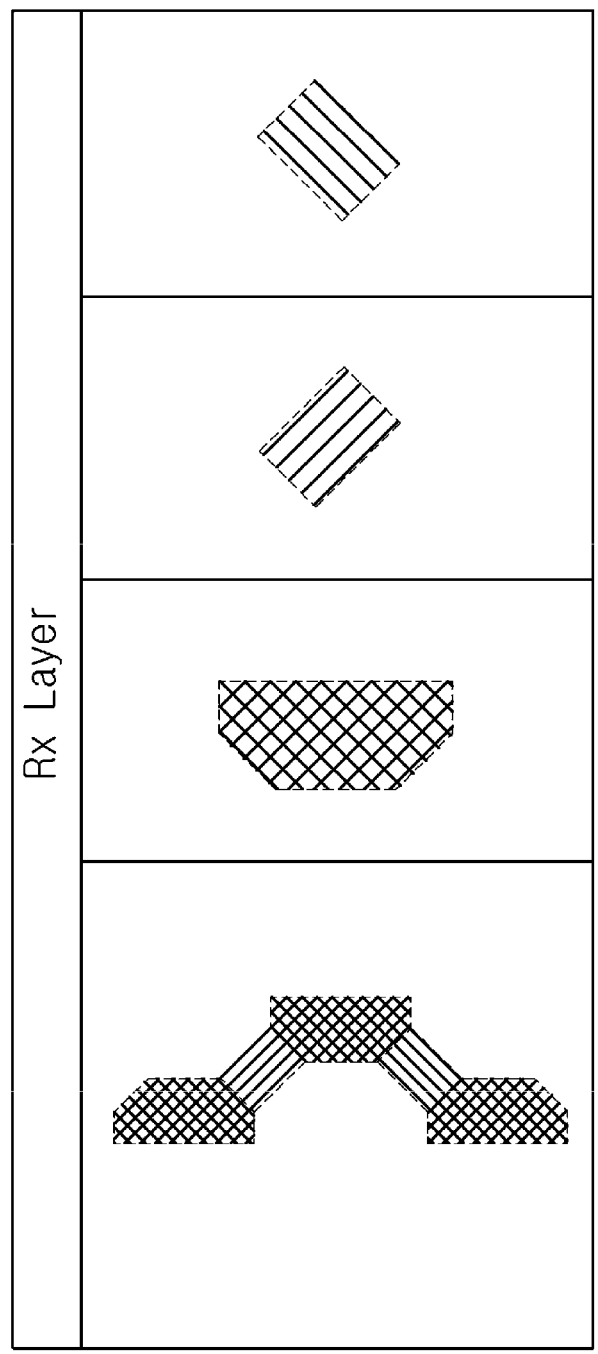
[Fig. 9b]

[Fig. 10]
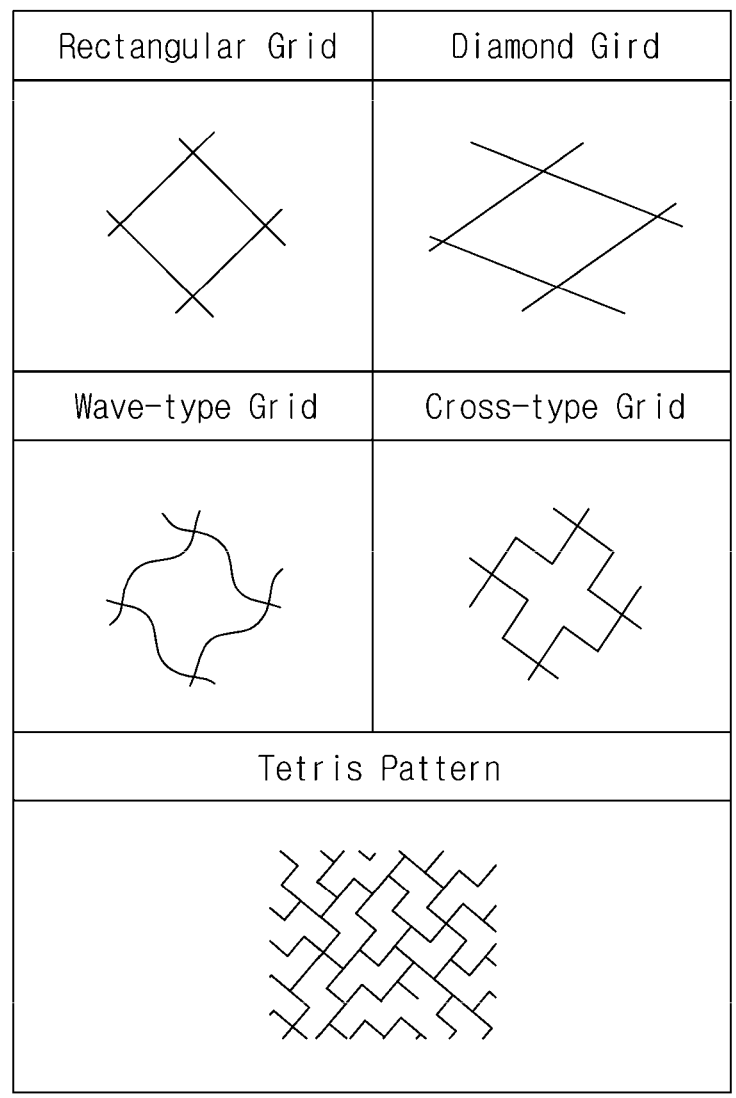

[Fig. 11a]
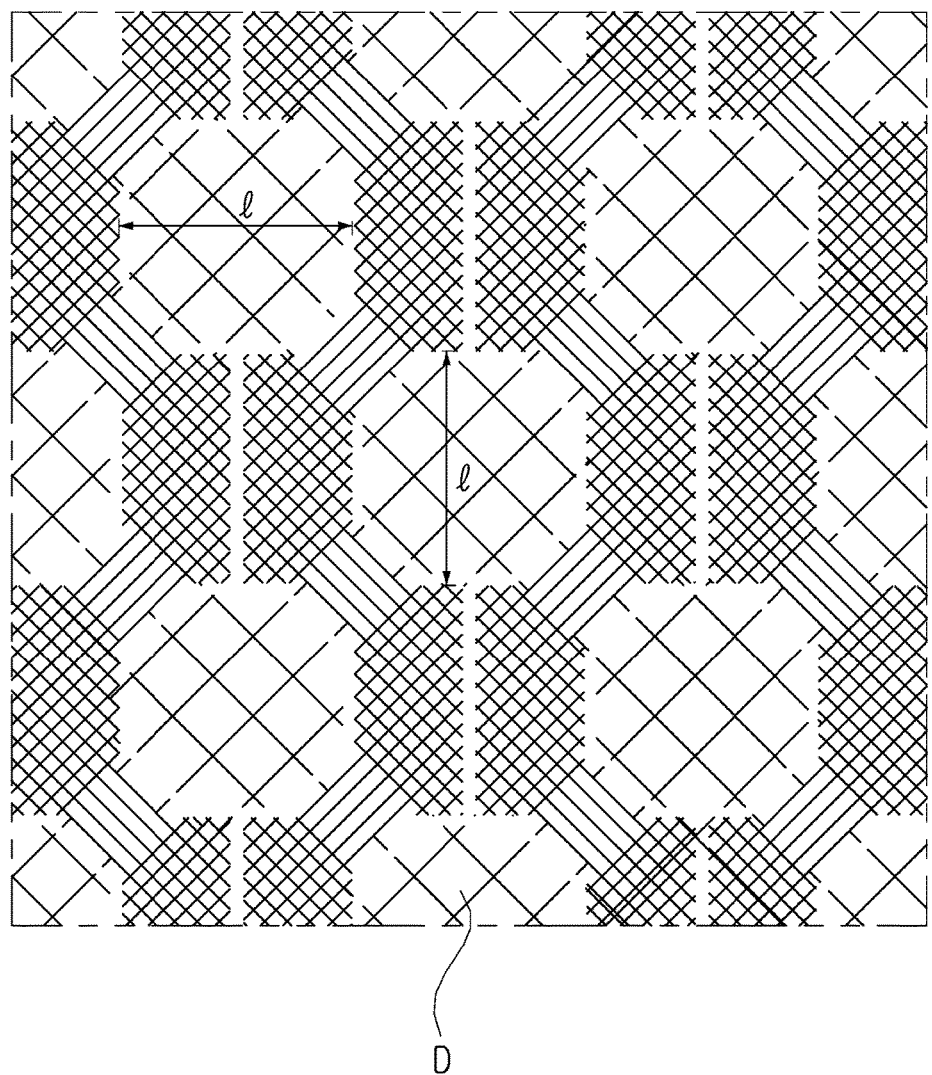
D

[Fig. 11b]
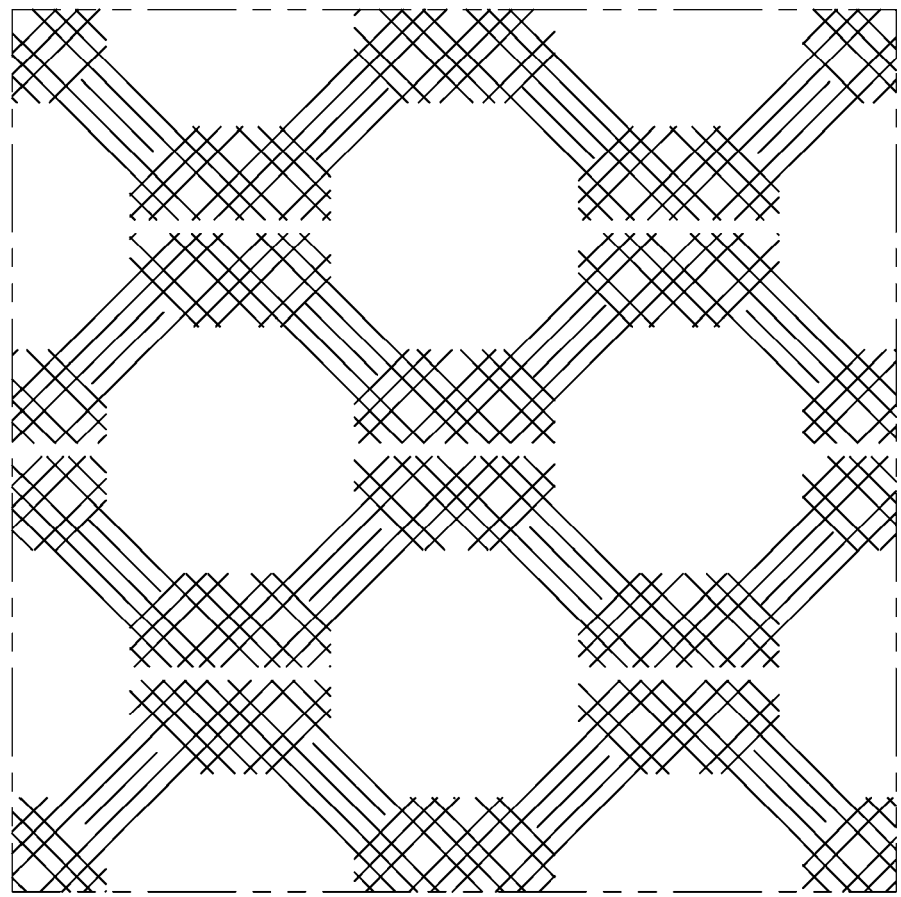
[Fig. 12]
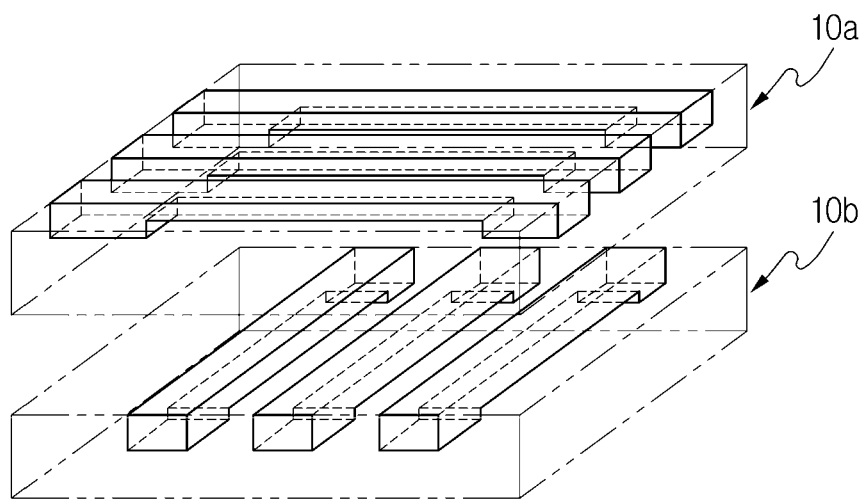

[Fig. 13]
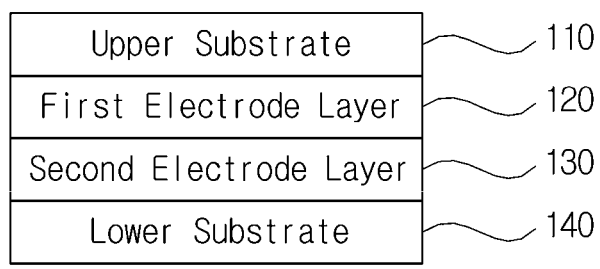

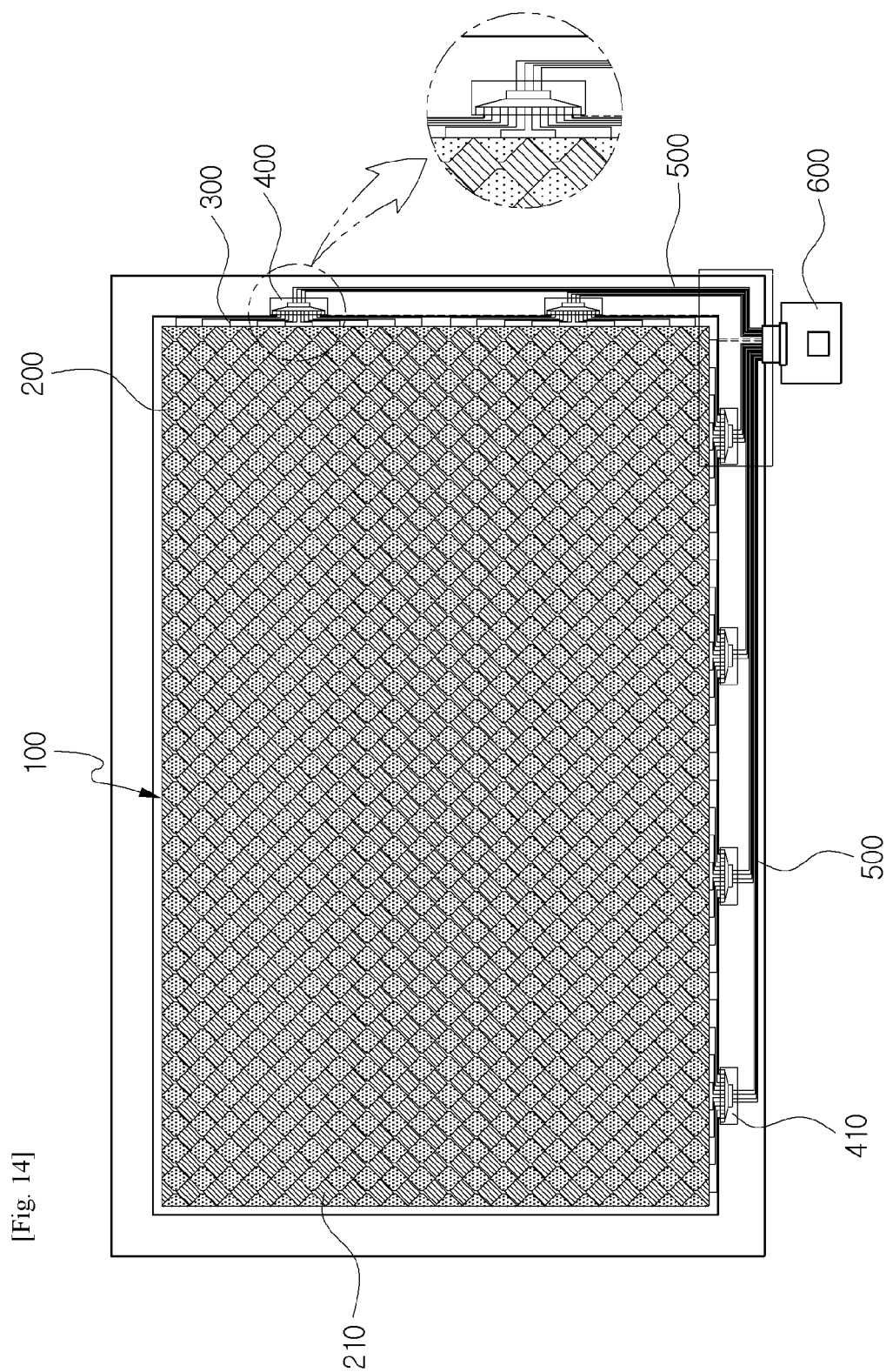
[Fig. 14]

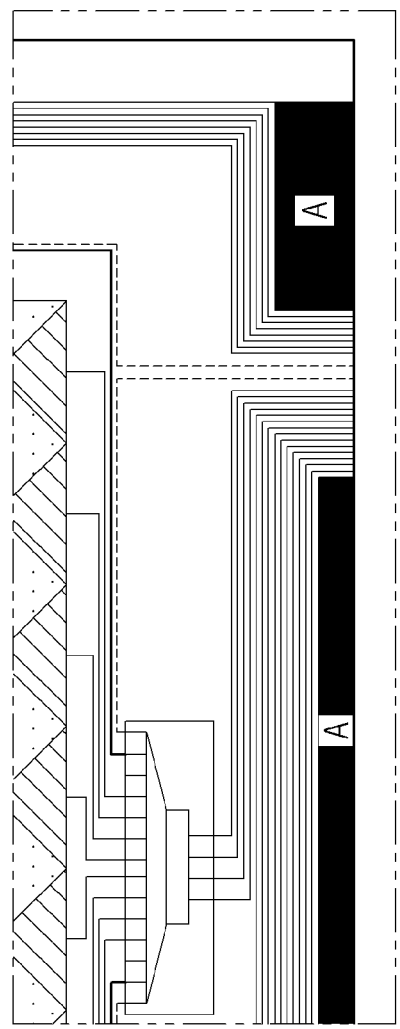
[Fig. 15]

CAPACITIVE-TYPE TOUCH SCREEN SENSOR, TOUCH SCREEN PANEL AND IMAGE DISPLAY DEVICE

CROSS REFERENCE TO RELATED APPLICATIONS

The present specification is a U.S. National Stage of International Patent Application No. PCT/KR2014/008435 filed Sep. 5, 2014, which claims priority to and the benefit of Korean Patent Application Nos. 10-2013-0108712 and 10-2014-0009112 filed in the Korean Intellectual Property Office on Sep. 10, 2013 and Jan. 24, 2014, respectively, the entire contents of which are incorporated herein by reference.

TECHNICAL FIELD

The present invention relates to a touch screen panel. Specifically, the present invention relates to a capacitive-type touch screen sensor forming electrode patterns using conductive materials, a touch screen panel, and an image display device including the touch screen panel.

BACKGROUND ART

Touch input devices are input-output devices for detecting a touch position of users on a display and receiving information of the detected touch position input-output devices to wholly control electronic devices such that display is controlled, and devices for recognizing contacts of objects such as fingers or touch pens on screens as input signals. Recently, the touch input devices have been widely built in mobile devices like mobile phones, PDA (Personal Digital Device), PMP (Portable Multimedia Player), and so forth. Also, the touch input devices have been employed over all industrial fields such as desktop computers, IPTV (Internet Protocol TV), state-of-the-art aircrafts, tanks, armored cars and the like, which use supporting operating systems of touch-input.

Such the touch input devices are classified into Resistive type, Capacitive-type, and Electro-Magnetic type. Two typical types among them are resistive type and capacitive type.

In the resistive type, two substrates coated with are formed. If a pressure is stressed through fingers or pens, substrate portions stressed by the pressure is adhered to recognize a position.

Capacitive type employs a principle for sensing electrostatic originated from human body and has many advantages of strong durability and speedy reaction time. However, the capacitive type has disadvantages of high cost and impossible operation wearing gloves. Typically, a capacitive touch screen pane according to a conventional art patters a transparent electrode of ITO (Indium Tin Oxide) to form detection and operating sensors. The major disadvantages are the difficulty of high cost, low touch sensitivity by high resistivity of ITO, and large-scale manufacturing.

In order to solve these problems, a capacitive touch screen panel advantageous to improve touch sensitivity and large-scale manufacturing by forming electrode patterns made of conductive materials with low resistance as compared with ITO has been suggested in a recent year. However, there are many problems in that Moire effect occur due to optical interference between electrode patterns and pixel patterns, or stacked electrode patterns, and the luminance of a touch screen becomes low by opaque electrode patterns.

SUMMARY OF THE INVENTION

The present invention has been made in an effort to provide a touch screen sensor, a touch screen panel, and an image display device thereof, which is capable of improving transmission, reducing Moire effect, and minimizing visibility of patterns in a capacitive-type touch screen panel forming electrode patterns using conductive materials.

Pursuant to embodiments of the present invention, a touch screen panel comprising a first sensor layer including a plurality of first sensor electrodes for detecting a position of a touch input on one axis and a second sensor layer stacked on an upper or lower part of the first sensor layer and including a plurality of second sensor electrodes for detecting a position of the touch input on another axis. In this case, each of the first sensor electrodes includes first detection regions arranged in a zigzag manner along a first direction and first connection regions for connecting the first detection regions, and each of the second sensor electrodes includes second detection regions arranged in a zigzag manner along a second direction and second connection regions for connecting the second detection regions Pursuant to embodiments of the present invention, electrode patterns of the first or second detection regions are different from electrode patterns of the first or second connection regions.

Pursuant to embodiments of the present invention, the first and second detection regions are not overlapped.

Pursuant to embodiments of the present invention, at least a portion of the first and second connection regions is overlapped.

Pursuant to embodiments of the present invention, the electrode patterns of the first detection regions are the same as the electrode patterns of the second detection regions.

Pursuant to embodiments of the present invention, the electrode patterns of the first detection regions are the same as the electrode patterns of the second detection regions. The electrode patterns of the first and second connection regions are different from the electrode patterns of the first and second detection regions. In this case, at least a portion of the first and second connection regions is overlapped, and patterns of regions where first and second connection regions are overlapped are the same the electrode patterns of the first and second detection regions.

Pursuant to embodiments of the present invention, the electrode patterns of the first and second detection regions include a grid pattern, and the electrode patterns of the first and second connecting regions include a straight-line pattern.

Pursuant to embodiments of the present invention, a straight-line direction of the straight-line pattern is in agreement with one direction of a straight line of the grid pattern.

Pursuant to embodiments of the present invention, the grid patterns of the first detection regions are not overlapped with the second detection regions.

Pursuant to embodiments of the present invention, at least one straight-line pattern of the grid patterns of the first and second detection regions is in parallel with the straight-line patterns of the first or second connection regions. In this case, at least one straight-line pattern of the grid patterns of the first and second detection regions is extended to be formed as the straight-line pattern of the electrode patterns of the first or second connection regions.

Pursuant to embodiments of the present invention, at least a portion of the straight-line patterns of the first and second connection regions.

Pursuant to embodiments of the present invention, the overlapped straight-line patterns of the first and second connection regions have straight lines with other direction.

Pursuant to embodiments of the present invention, the gird patterns are formed by overlapping the straight-line patterns of the first and second connection regions.

Pursuant to embodiments of the present invention, the gird patterns are the same as the grid patterns of the first and second connection regions.

Pursuant to embodiments of the present invention, the number of the straight-line are plural in the straight-line patterns.

Pursuant to embodiments of the present invention, the number of the straight-lines of the straight-line patterns is 3 to 5.

Pursuant to embodiments of the present invention, significant difference of linear density in areas of the first detection region and the first connecting region or the second detection region and the second connecting region is 4:1 to 5:1.

Pursuant to embodiments of the present invention, the area or linear density within the pattern of the first sensor is higher than the area or linear density within the pattern of second sensor.

Pursuant to embodiments of the present invention, line thickness of each of the patterns of the first connecting region where the first sensor layer and second layer are crossed and the second connecting region is thinner than the line thickness of the first sensor region and the second sensor region.

Pursuant to embodiments of the present invention, the second sensor layer where the second sensor electrode is formed is laminated on the lower part of the first sensor layer where the first sensor electrode. In this case, the first sensor electrode of the first sensor layer and the second sensor electrode of the second sensor layer are laminated to be opposite each other.

Pursuant to embodiments of the present invention, an image display device comprises a display panel for displaying an image using a plurality of patterned pixels and a touch screen panel arranged on the display panel and comprising a first sensor layer including a plurality of first sensor electrodes for detecting a position of a touch input on one axis, and a second sensor layer stacked on an upper or lower part of the first sensor layer and including a plurality of second sensor electrodes for detecting a position of the touch input on another axis. In this case, each of the first sensor electrodes includes first detection regions arranged in a zigzag manner along a first direction and first connection regions for connecting the first detection regions, and each of the second sensor electrodes includes second detection regions arranged in a zigzag manner along a second direction and second connection regions for connecting the second detection regions. The electrode patterns of the first and second detection regions include a grid pattern formed by straight lines, and the electrode patterns of the first and second connecting regions include a straight-line pattern formed by straight lines. Directions of the straight lines of the grid pattern or the straight-line pattern are inclined by a predetermined angle.

Pursuant to embodiments of the present invention, at least a portion of the first and connecting regions is overlapped. In this case, the overlapped pattern of the first and second connecting regions is the same as the electrode patterns of the first and second detection regions.

Pursuant to embodiments of the present invention, one direction of straight lines of the grid pattern is in parallel with the directions of the straight-line pattern.

Pursuant to embodiments of the present invention, the predetermined angle is ranged from 30° to 60°.

Pursuant to embodiments of the present invention, a direction of the patterns of the pixels is a horizontal direction and a vertical direction.

Pursuant to embodiments of the present invention, an intersection angle of two straight lines of the grid pattern is ranged from 30° to 60°.

Pursuant to embodiments of the present invention, the image display device further comprises a sensing IC connected to a first signal line at every first electrode pattern of a predetermined number in the touch screen panel and receiving a touch signal from the first electrode pattern to covert a digital signal, a driving IC connected to a first signal line at every second electrode pattern of a predetermined number in the touch screen panel and receiving a touch signal from the second electrode pattern to covert a digital signal, and a second signal line transmitting the digital signal converted from the sensing IC and the driving IC.

Pursuant to embodiments of the present invention, the image display device further comprises a signal line transmitting detected touch signal from the first and second electrode patterns in the touch screen panel and a ground line arranged to be laminated with the signal in a row at a predetermined interval. In this case, the ground line is formed in a thickness thicker than the signal line at a space where the signal line is not positioned.

Pursuant to embodiments of the present invention, a touch screen sensor comprises a sensor layer having a plurality of sensor electrodes for detecting a position of a touch input on one axis. In this case, each of the sensor electrodes includes detection regions arranged in a zigzag manner along one direction and connection regions for connecting the first detection regions.

Pursuant to embodiments of the present invention, electrode patterns of the detection regions are different from electrode patterns of connection regions.

Pursuant to embodiments of the present invention, the electrode patterns of the detection regions include a grid pattern, and the electrode patterns of the connecting regions include a straight-line pattern.

Pursuant to embodiments of the present invention, a straight-line direction of the straight-line pattern is in agreement with one direction a straight line of the grid pattern.

Pursuant to embodiments of the present invention, at least one straight-line pattern of grid patterns is in parallel with the straight-line pattern of the electrode pattern of the connecting regions. In this case, at least one straight-line pattern of grid patterns is extended to be formed as the straight-line pattern of the electrode patterns of connection regions.

Pursuant to embodiments of the present invention, the number of the straight-line are plural in the straight-line patterns.

Pursuant to embodiments of the present invention, the number of the straight-lines of the straight-line patterns is 3 to 5.

Pursuant to embodiments of the present invention, two neighboring sensor electrodes among the sensor electrodes are symmetric each other.

Pursuant to embodiments of the present invention, one of the sensing regions in one sensor electrode is closely arranged with one of the sensing regions in the other sensor electrode each other to be a couple in the two sensor electrodes being symmetric.

Pursuant to embodiments of the present invention, the two sensor regions being the couple are formed in an octagonal shape.

Pursuant to embodiments of the present invention, the electrode pattern between the two sensor regions being is insulated on a continuous line of the same direction and the same pattern.

Pursuant to embodiments of the present invention, significant difference of linear density in areas of the detection region and connecting region is 4:1 to 5:1.

Pursuant to embodiments of the present invention, a line thickness in the connecting regions of the sensor layer is thinner than a line thickness in the detection regions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 1A to 1C show examples of a conventional constitution of a capacitive-type touch screen panel forming an electrode pattern using conductive materials useful for understanding of the present invention;

FIGS. 2A to 2C show a constitution of a capacitive-type touch screen panel forming an electrode pattern using conductive materials according to an embodiment of the present invention;

FIGS. 3A to 3C concretely show a constitution of a capacitive-type touch screen panel according to an embodiment of the present invention;

FIG. 4A is an enlarged view illustrating connecting regions R2 shown in FIG. 1A, and FIG. 4B is an enlarged view illustrating connecting regions R4 shown in FIG. 1B;

FIG. 5A is an enlarged view illustrating connecting regions B1' shown in FIG. 3A, FIG. 5B is an enlarged view illustrating connecting regions B2' shown in FIG. 3B, and FIG. 5C is an enlarged view illustrating overlapped portions of the connecting regions Br and the connecting regions B2';

FIG. 6 shows a grid pattern and a pixel pattern according to an embodiment of the present invention;

FIG. 7 is an enlarged view of a part of the touch screen panel shown in FIG. 1C;

FIG. 8 is an enlarged view of a part of the touch screen panel shown in FIG. 3C;

FIG. 9A to 9B show a part of a sensor electrode according to an embodiment of the present invention;

FIG. 10 shows examples of patterns applicable to a sensing region in embodiments of the present invention;

FIGS. 11A to 11B show a form of a sensor electrode according to an embodiment of the present invention;

FIG. 12 is a cross-sectional view of a sensor electrode according to an embodiment of the present invention;

FIG. 13 shows a structure of a touch screen sensor according to an embodiment of the present invention;

FIG. 14 shows a structure of an image display device according to an embodiment of the present invention; and FIG. 15 shows a form of a ground line according to another embodiment of the present invention;

DETAILED DESCRIPTION

Hereinafter, the present invention will be described in detail with reference to the drawings. In describing the present invention, detailed descriptions related to publicly known functions or configurations will be omitted in order not to obscure the gist of the present invention.

FIGS. 1A to 1C show examples of a conventional constitution of a capacitive-type touch screen panel forming an electrode pattern using conductive materials useful for understanding of the present invention. FIG. 1A shows a first sensor layer 10a for detecting a position of a touch input on horizontal axis, FIG. 1B shows a second sensor layer 10b for detecting a position of a touch input on vertical axis, and FIG. 1C shows the second sensor layer 10b stacked an upper or lower part of the first sensor layer 10a.

Referring to FIG. 1A, the first sensor layer 10a includes a plurality of sensor electrodes 11, which are formed toward a vertical direction to detect the position of the touch input on horizontal axis. Each of the sensor electrodes 11 comprises detection regions R1 for detecting a touch of objects (or users) on a surface of the touch screen panel and connecting regions R2 for connecting the detection regions R1.

The sensor electrodes 11 include a grid pattern in which lines of constant two directions are interconnected over the detection regions R1 and the connecting regions R2. The grid pattern is made of conductive materials. That is, a pattern is embossed in the first sensor layer 10a and conductive materials may be filled in the embossed pattern.

Furthermore, the first sensor layer 10a, in order to prevent visibility degradation due to contrast difference between regions of the sensor electrodes 11 and the rest of the region of the sensor electrodes 11, is electrically insulated from the sensor electrodes 11 and further includes dummy sensor electrodes 12, which is formed in the same or similar pattern with the sensor electrodes 11 and do not perform a detection function. It seems that the pattern of the sensor electrode 11 has continuity of a pattern of the dummy electrodes 12, but the sensor electrodes 11 are electrically insulated from the dummy electrodes 12 because the patterns are cut at a boundary between the patterns of the sensor electrodes 11 and the dummy electrodes 12.

Referring to FIG. 1B, the second sensor layer 10b includes a plurality of sensor electrodes 13, which are formed toward a vertical direction to detect the position of the touch input on vertical axis. Each of the sensor electrodes 13 comprises detection regions R3 for detecting a touch of objects on a surface of the touch screen panel and connecting regions R2 for connecting the detection regions R4.

Like the sensor electrodes 11, the sensor electrodes 13 include a grid pattern in which constant lines of constant two directions are interconnected over the detection regions R3 and the connecting regions R4. The grid pattern is made of conductive materials. That is, a pattern is embossed in the first sensor layer 10b and conductive materials may be filled in the embossed pattern.

Furthermore, the second sensor layer 10b is electrically insulated from the sensor electrodes 13 and further includes dummy sensor electrodes 14, which is formed in the same or similar pattern with the sensor electrodes 13 and do not perform a detection function. It seems that the pattern of the sensor electrode 13 is continuous to a pattern of the dummy electrodes 14, but the sensor electrodes 13 are electrically insulated from the dummy electrodes 14 because the patterns are cut at a boundary between the patterns of the sensor electrodes 13 and the dummy electrodes 14.

However, the angle of the grid patterns of the first sensor layer 10a and the second sensor layer 10b is tilted so as to reduce Moire effect. In other words, a line direction of the grid pattern of the first sensor layer 10a is not corrected with that of the grid pattern of the second sensor layer 10b. Moire effect means interference phenomenon created when two independent and periodic patterns are stacked. Moire effect is observed in wave shape, ripple shape, wisp shape, and so forth. By tilting the angle of the grid patterns of the first sensor layer 10a and the second sensor layer 10b, Moire effect can be reduced to some degree when the angle of them is correct.

FIG. 1C shows s stacked structure of the first and second sensor layers 10a and 10b. Referring to FIG. 1C, when the first and second sensor layers 10a and 10b are stacked, the angle of them is tilted, thereby reducing Moire effect to some degree. There is a limitation to overcome Moire effect since similar gird patterns are stacked.

Moreover, a touch screen panel is generally stacked on a display panel for displaying an image using patterned pixels in an image display device. In this case, Moire effect is induced by interference between pixel patterns such as interference between the grid pattern of the first sensor layer 10a and a pixel pattern or the grid pattern of the second layer 10b and a pixel pattern.

In addition, the grid pattern of the first sensor electrode 10a is overlapped with the grid pattern of the second sensor electrode 10b over whole regions of the touch screen panel as shown due to the dummy electrodes 12 of the first sensor layer 10a and the dummy electrodes 14 of the second sensor layer 10b, thereby decreasing transmittance.

FIGS. 2A to 2C show a constitution of a capacitive-type touch screen panel forming an electrode pattern using conductive materials according to an embodiment of the present invention. FIG. 2A shows a first sensor layer 20a for detecting a position of a touch input on horizontal axis, FIG. 2B shows a second sensor layer 20b for detecting a position of a touch input on vertical axis, and FIG. 2C shows the second sensor layer 20b stacked an upper or lower part of the first sensor layer 20a.

Referring to FIG. 2A, the first sensor layer 20a includes a plurality of sensor electrodes 21, 22, 23, and 24 which are formed toward a vertical direction to detect the position of the touch input on horizontal axis. Each of the sensor electrodes 22 comprises detection regions S1 for detecting a touch of objects (or users) on a surface of the touch screen panel and connecting regions B1 for connecting the detection regions S1.

In this embodiment, the detection regions S1 are arranged in a zigzag manner along vertical direction and the connecting regions B1 connects the detection regions S1. Accordingly, a connecting direction of the connecting regions B1 is also alternately repeated in a zigzag manner.

Also, it is assumed that an imaginary line (vertical line) exists between two neighboring sensor electrodes, the two sensor electrodes are symmetric at a center of the imaginary line. That is, the sensor electrode 21 is symmetrical with the sensor electrode 22, and the sensor electrode 22 is symmetrical with the sensor electrode 23.

Furthermore, one of the sensing regions in one sensor electrode is closely arranged with one of the sensing regions in the other sensor electrode each other to be a couple in the two sensor electrodes being symmetric. The two sensor regions being the couple are formed in an octagonal shape. For example, referring to FIG. 2A, the detection region (upper S1) and the detection region being neighboring on the right side thereof become a couple in sensor electrode 22 and the sensor electrode 23, and these two detection regions being the couple are formed in an octagonal shape as shown. However, since these two detection regions being the couple are arranged on the sensor electrodes, which are different, they are insulated each other. Also, the detection region (lower S1) and the detection region being neighboring on the left side thereof become a couple in sensor electrode 21 and the sensor electrode 22, and these two detection regions being the couple are formed in an octagonal shape as shown.

The detection regions S1 and the connecting regions B1, as not shown, are comprised of a predetermined electrode pattern. The predetermined electrode pattern is made of conductive materials. That is, a predetermined pattern is embossed in the first sensor layer 20b and conductive materials may be filled in the embossed pattern. The contour line of each of the sensor electrodes 21, 22, 23, and 24 are shown in FIG. 2A for convenience sake. The contour line is a part of the patterns and may exist with the patterns separately, or the contour line shown does not really exist and may be a boundary of a region in which the patterns are not formed.

Referring to FIG. 2A, electrode patterns such as the dummy electrodes 12 of FIG. 1A do not exist in regions other than the sensor electrodes 21, 22, 23, and 24.

Referring to FIG. 2A, the second sensor layer 20b includes a plurality of sensor electrodes 25, 26, 27, and 28 which are formed toward a horizontal direction to detect the position of the touch input on vertical axis. One sensor electrode 26 comprises detection regions S2 for detecting a contact of a object on a surface of the touch screen panel and connecting regions B2 for connecting the detection regions S2.

In this embodiment, the detection regions S2 are arranged in a zigzag manner along horizontal direction and the connecting regions B2 connects the detection regions S2. Accordingly, a connecting direction of the connecting regions B2 is also alternately repeated in a zigzag manner.

Also, it is assumed that an imaginary line (horizontal line) exists between two neighboring sensor electrodes, the two sensor electrodes are symmetric at a center of the imaginary line. That is, the sensor electrode 25 is symmetrical with the sensor electrode 26, and the sensor electrode 26 is symmetrical with the sensor electrode 27.

Furthermore, one of the sensing regions in one sensor electrode is closely arranged with one of the sensing regions in the other sensor electrode each other to be a couple in the two sensor electrodes being symmetric each other. The two sensor regions being the couple are formed in an octagonal shape. For example, referring to FIG. 2B, the detection region (left S2) and the detection region being neighboring on the upper side thereof become a couple in sensor electrode 25 and the sensor electrode 26, and these two detection regions being the couple are formed in an octagonal shape as shown. However, since these two detection regions being the couple are arranged on the sensor electrodes, which are different, they are insulated each other. Also, the detection region (right S2) and the detection region being neighboring on the lower side thereof become a couple in sensor electrode 26 and the sensor electrode 27, and these two detection regions being the couple are formed in an octagonal shape as shown.

The detection regions S2 and the connecting regions B2, as not shown, are comprised of a predetermined electrode pattern. The contour line of each of the sensor electrodes 25, 26, 27, and 28 are shown in FIG. 2B for convenience sake. The contour line is a part of the patterns and may exist with the patterns separately, or the contour line shown does not really exist and may be a boundary of a region in which the patterns are not formed.

Referring to FIG. 2B, electrode patterns such as the dummy electrodes 14 of FIG. 1B do not exist in regions other than the sensor electrodes 25, 26, 27, and 28.

FIG. 2C shows s stacked structure of the first and second sensor layers 20a and 20b. Referring to FIG. 2C, when the touch screen panel is viewed from a stacked direction, that is, from a top view or bottom view, the detection region S1 of the first sensor layer 20a is not overlapped with the detection region S2 of the second sensor layer 20b. In other words, when the touch screen panel is viewed from the stacked direction, the detection region S1 of the first sensor region 20a is arranged in regions other than regions of the sensor electrode of the sensor layer 20b, and the detection region S2 of the first sensor region 20b is arranged in regions other than regions of the sensor electrode of the sensor layer 20a.

However, when the touch screen panel is viewed from the stacked direction, the connecting region B1 of the first sensor layer 20a is overlapped with the connecting region B2 of the second sensor layer 20b each other.

In order to minimize Moire effect and improve transmittance, when the touch screen panel is viewed from the stacked direction, it is preferable that the electrode pattern is viewed as one layer in two dimension even if one and others of the electrode patterns are formed on a separate layer in three dimension.

Accordingly, as mentioned above, when the detection region S1 of the first sensor layer 20a is not overlapped with the detection region S2 of the second sensor layer 20b and the connecting region B1 of the first sensor layer 20a is overlapped with the connecting region B2 of the second sensor layer 20b, if the detection region S1 and the detection region S2 are formed in the same or similar pattern, and if the connecting region B1 and the connecting region B2 having different pattern with the detection regions S1 and S2 are overlapped each other, they are formed in the same or similar pattern as the detection regions S1 and S2, it is possible that the electrode patterns is viewed as one layer in two dimension.

In other words, when the detection regions S1 and S2 are a specific pattern, if a part of the specific pattern is decided as a pattern of the connecting region B1, and the rest of the specific pattern is decided as a pattern of the connecting region B2, the specific pattern may have the same or similar pattern as the detection regions S1 and S2 if the connecting regions B1 and B2 are overlapped.

Concretely, in an embodiment of the present invention, the electrode patterns of the detection regions S1 and S2 may be a grid pattern, a straight-line pattern of one direction of the grid pattern may be a pattern of the connecting region B1, and a straight-line pattern of the other direction of the grid pattern may be a pattern of the connecting region B2.

FIGS. 3A to 3C concretely show a constitution of a capacitive-type touch screen panel according to an embodiment of the present invention. FIG. 3A shows a first sensor layer 20a' for detecting a position of a touch input on horizontal axis, FIG. 3B shows a second sensor layer 20b' for detecting a position of a touch input on vertical axis, and FIG. 3C shows the second sensor layer 20b' stacked an upper or lower part of the first sensor layer 20a'.

The capacitive-type touch screen panel according to the present invention includes all features of embodiments described through FIGS. 2A to 2C, and therefore, to avoid description duplication, their description is omitted herein and additional features will be explained below.

Referring to FIG. 3A, in sensor electrodes 22', electrode patterns of detection regions S1' include a grid pattern, and electrode patterns of connecting regions Br for connecting the detection regions S1' include a straight-line pattern including a plurality of straight lines, which are parallel each other.

The grid pattern is a pattern in which lines of constant two directions are interconnected. The straight-line direction of the straight-line pattern of the connecting regions B1' is in agreement with one direction of the straight line of the grid pattern. Accordingly, as shown in FIG. 3A, the straight-line direction of the straight-line pattern of the connecting regions Br is also alternately repeated in a zigzag manner.

Referring to FIG. 3B, in sensor electrodes 26', electrode patterns of electrode patterns of detection regions S2 include the same or similar grid pattern as the detection regions S1', and electrode patterns of connecting regions B2 for connecting the detection regions S2' include a straight-line pattern including a plurality of straight lines, which are parallel each other.

Like FIG. 3A, the straight-line direction of the straight-line pattern of the connecting regions B2' is in agreement with one direction of the straight line of the grid pattern. Accordingly, as shown in FIG. 3B, the straight-line direction of the straight-line pattern of the connecting regions B2' is also alternately repeated in a zigzag manner. FIG. 2C shows s stacked structure of the first and second sensor layers 20a and 20b.

FIG. 3C shows s stacked structure of the first and second sensor layers 20a' and 20b'. Referring to FIG. 3C, when the touch screen panel is viewed from a stacked direction, the grid pattern of the detection region S1' of the first sensor layer 20a' is not overlapped with the grid pattern of the detection region S2' of the second sensor layer 20b'. However, when the touch screen panel is viewed from the stacked direction, the connecting region B1' of the first sensor layer 20a' is overlapped with the connecting region B2' of the second sensor layer 20b' each other. The overlapped connecting region Br and the connecting region B2' have the same or similar grid pattern as the detection regions S1' and the detection regions S2'. That is, since the straight-line patterns of the connecting region Br and the connecting region B2' include straight lines whose direction are different, the two straight-line patterns are overlapped, thereby forming a grid pattern.

According to an embodiment of the present invention, when the touch screen panel is viewed from a stacked direction, only one-layered grid pattern is formed at any portions among the detection region S1' of the first sensor layer 20a' and the detection region S2' of the first sensor layer 20b'. Also, the overlapped portion of the detection region S1' of the first sensor layer 20a' and the detection region S2' of the first sensor layer 20b' has a continuity of the grid pattern of the detection region S1' or the detection region S12'. Resultantly, when the touch screen panel is viewed from the stacked direction, it seems that simple and continuous grid patterns are formed as a whole and the contrast difference of the detection regions S1' and S2' and the connecting regions Br and B2', so that transmittance and visibility are improved. Additionally, there is little interference between the patterns of the first sensor layer 20a' and the second sensor layer 20b', and thereby minimizing Moire effect.

Furthermore, according to an embodiment of the present invention, the electrode pattern of the first sensor layer 20a' may have the same as that of the second sensor layer 20b'. Comparing FIG. 3A with FIG. 3B, the pattern shown in FIG. 3A is rotated to be in agreement with the pattern shown in FIG. 3B. There are many advantages of agreement tolerance reduction and manufacturing process such that patterns can be formed using one mold for forming electrode patterns.

FIG. 4A is an enlarged view illustrating connecting regions R2 shown in FIG. 1A, and FIG. 4B is an enlarged view illustrating connecting regions R4 shown in FIG. 1B.

Referring to FIG. 4A or 4B, there may be problems that the detection regions are electrically disconnected if a part of the patterns of the connecting regions R2 and R4 are left or disconnected. In other words, if breakaway or disconnection occurs in the lines shown in FIG. 4A or 4B, the detections regions are connected not in a row but in a series, so that total resistance becomes increased.

Referring to FIGS. 4A and 4B, the pattern shape of the detection region and the connecting region becomes the same. At this time, since the longitudinal direction of the connecting region is not in agreement with the line direction of the connecting region, the number of line for substantially transmitting signals is decreased from 3 to 2 partially. If breakaway or disconnection occurs at an interval in which the number of the lines is decreased, the signals are not transmitted and total resistance is increased.

The grid patterns between the connecting region R2 and connecting region R4 are overlapped, resulting in an inevitable decrease of transmittance and occurrence of Moire effect by interference of patterns at the connecting regions.

FIG. 5A is an enlarged view illustrating connecting regions B1' shown in FIG. 3A, FIG. 5B is an enlarged view illustrating connecting regions B2' shown in FIG. 3B, and FIG. 5C is an enlarged view illustrating overlapped portions of the connecting regions Br and the connecting regions B2'.

Referring to FIG. 5A or 5B, since a direction of the straight-line pattern of the connecting regions B1' and B2' is in agreement with the longitudinal direction of the connecting regions B1' and B2', it is assured that at least three number of straight-line patterns (lines) are formed stably. According to an embodiment of the present invention, regions the connecting regions Br and B2' occupy in the sensor layer is limited (a region a connecting region occupies is determined by the minimum area a detection region for a detecting function). Considering interference, resistance, transmittance stability of signals in these limited regions, the number of the straight-line pattern is effectively 3 or 5. In the event that one of the straight-line patterns of the connecting regions B1' and B2', unless all straight lines do not leave or be disconnected, the electrical connection between the detection regions is not off. That is, since the connecting regions Br and B2' for connecting the detection regions include a straight-line pattern including at least three straight lines, even if breakaway or disconnection occurs in a part of straight lines, the electrical connection between the detection regions is not off.

Referring to FIG. 5C, the straight-line pattern of the connecting region B1' is overlapped with the straight-line pattern of the connecting region B2', and thereby forming simple grid pattern. As a result, it is assured that Moire effect is reduced and transmittance is improved.

Additionally, as mentioned above, the touch screen panel is generally stacked on a display panel for displaying an image using patterned pixels, which are formed toward a horizontal and a vertical direction. And, when the direction of such pixel pattern is similar to the pattern direction of the touch screen, Moire effect may become more occur due to interference with the pixel pattern.

Meanwhile, according to an embodiment of the present invention, a straight-line direction of the grid pattern (the grid pattern is formed by stacking the patterns of the first and second sensor layers) is tiled with respect to the pixel pattern that is, a pixel matrix, at a predetermined angle, so that Moire effect is reduced.

FIG. 6 shows a grid pattern and a pixel pattern of a horizontal direction and a vertical direction according to an embodiment of the present invention. Referring to FIG. 6, one straight-line direction (or a straight-line direction of a straight-line pattern) the grid pattern (the gird pattern as shown may be a grid pattern of a detection region in a first sensor layer, a grid pattern of a detection region in a second sensor layer, or a grid pattern formed by overlapping a connection region of a first sensor layer and a connection region of a second sensor) is tiled with one direction of a pixel matrix as much as $\theta 1$, and an internal angle of a grid pattern (an intersection angle of two straight-lines in a grid pattern) is $\theta 2$. Where, $\theta 1$ may be ranged from 30° to 60°, and $\theta 2$ may be ranged from 60° to 120°. More preferably, $\theta 1$ may be ranged from 35° to 55°, and $\theta 2$ may be ranged from 82° to 98°. Within these ranged of $\theta 1$ and $\theta 2$, Moire effect can be dramatically prevented.

FIG. 7 is an enlarged view of a part of the touch screen panel shown in FIG. 1C. As shown in FIG. 7, the grid patterns of the detection regions R1 and R3 are overlapped with the grid patterns of the dummy electrodes 12 and 14, or the grid patterns of the connecting regions R1 and R3, so that transmittance and visibility become reduced.

FIG. 8 is an enlarged view of a part of the touch screen panel shown in FIG. 3C. As shown in FIG. 8, since one of grid patterns among the detection region S1' or the detection region S2' exists without a dummy electrode, or only one grid pattern exists in two dimension even if the connecting region B1' is overlapped with the connecting region B2', so that transmittance and visibility become improved.

An aperture ratio for indicating transmittance or visibility is defined as a ratio of a transmittance area in which a line area is not occupied in a standard area. An aperture ratio as shown in FIG. 8 has bigger value than that as shown in FIG. 7. The aperture ratio represents 92% in FIG. 7, and the aperture ratio represents 98.3% in FIG. 8.

FIGS. 9A to 9B show a part of a sensor electrode according to an embodiment of the present invention.

Referring to FIG. 9A, a touch screen sensor for detecting a position on a vertical axis represents a part of one sensor electrode formed on a first sensor layer and shows a structure of a detection region and a connecting region.

At this time, if a line width of a pattern for forming the sensor electrode is 0.01 mm, an area (a line area) of the pattern occupies from whole area of the detection region being 12.56 mm$^2$ is 0.3555 mm$^2$, so that an aperture ratio represents 97.18%.

And, an area of the pattern occupies from whole area of one end of the connecting region being 4.1 mm$^2$ is 0.07692 mm$^2$, so that an aperture ratio represents 98.12%. An area of the pattern occupies from whole area of the other end of the connecting region being 4.03 mm$^2$ is 0.07692 mm$^2$, so that an aperture ratio represents 98.12%.

An area of the detection region may be 10 to 15 mm$^2$, and an area of the connecting region may be 2 to 5 mm$^2$. Accordingly, it is preferable that a ratio an electrode occupies within an area of the detection region and an area of the connecting region is ranged from 4:1 to 5:1.

Referring FIG. 9B, a touch screen sensor for detecting a position on a vertical axis represents a part of one sensor electrode formed on a second sensor layer and shows a structure of a detection region and a connecting region.

At this time, if a line width of a pattern for forming the sensor electrode is 0.01 mm, an area (a line area) of the pattern occupies from whole area of the detection region being 12.56 mm$^2$ is 0.3555 mm$^2$, so that an aperture ratio represents 97.18%.

And, an area of the pattern occupies from whole area of one end of the connecting region being 4.1 mm$^2$ is 0.07692 mm$^2$, so that an aperture ratio represents 98.12%. An area of the pattern occupies from whole area of the other end of the connecting region being 4.03 mm$^2$ is 0.07692 mm$^2$, so that an aperture ratio represents 98.12%.

An area of the detection region may be 10 to 15 mm$^2$, and an area of the connecting region may be 2 to 5 mm$^2$. Accordingly, it is preferable that a ratio an electrode, that is, significant difference of linear density occupies within an area of the detection region and an area of the connecting region is ranged from 4:1 to 5:1.

As shown in FIGS. 9A and 9B, if an aperture ratio is designed to be maintained over 97%, visibility and transmittance as well as touch sensitivity can be improved.

Preferable standard for forming these sensor electrodes is as following table 1.

TABLE 1

| Item | Standard |
| --- | --- |
| Electrode Material | 0.000048~0.0000048 (Resistivity $\epsilon$) |
| Circuit Type | Various Type |
| Gird Pattern | Various Type |
| Grid Distance | Average 0.4~0.8 mm |
| Electrode | Line Width: 1~10 μm |
| | Line Thickness: 1~10 μm |
| Channel | Area: 10~15 mm$^2$ |
| Bridge | Area: 2~3 mm$^2$ |

Where, the channel may represent a detection region, and a bridge may represent a connecting region.

In some embodiments of the present invention, the line width of the pattern of the detection region or connecting region may be ranged from 1 μm to 10 μm, and a pitch defined as an interval between the lines may be ranged from 300 μm to 700 μm. Also, the length of the connecting region (a separation distance between the detection regions) may be ranged from 1.5 μm to 2 μm, and a separation distance (l) between the detection regions on the same line may be ranged from 3 μm to 9 μm. The number of straight-line of the straight-line pattern in the connecting region may be properly determined based on signal transmittance efficiency and process defect, and may be 3 to 5.

FIG. 10 shows examples of patterns applicable to a sensing region in embodiments of the present invention. The pattern applicable to the detection region, as shown in FIG. 10, may be one of a rectangular grid pattern, a diamond grid pattern, a wave-type grid pattern, a cross-type grid pattern, and a tetris pattern (combination of tetris blocks). If a pattern for the detection region is determined as a specific pattern, a pattern for the connecting region may be determined as a part of the specific pattern. In other words, a partial pattern included in the specific pattern becomes a pattern for a connecting region of one sensor layer, and a part of the rest of pattern included in the specific pattern becomes a pattern for a connecting region of the other sensor layer. As a result, if the two patterns are overlapped, a pattern for a connecting region can be determined so as to form a specific pattern. As above-mentioned embodiments, if a pattern for a detection region is a grid pattern, a pattern for connecting regions to be overlapped can be determined as straight-line patterns having different directions.

According to the present invention, a sensor electrode is designed to maintain an aperture ratio to be over 97%, and thereby improving visibility as well as securing proper capacitance. Hereinafter, various ways to improve visibility and secure proper capacitance will be described in detail.

FIGS. 11A to 11B show a form of a sensor electrode according to an embodiment of the present invention.

Referring to FIGS. 11A and 11B, irregular patterns may be formed on upper and lower substrates employing significant difference of linear density. That is, the linear density of each of patterns, which forms sensor electrodes in first and second sensor layers, may have different. The linear density of the pattern in the first sensor layer in FIG. 11A is higher than that of the pattern in the second sensor layer.

That is, assuming that the linear density of the pattern in the first sensor layer is 100% in accordance with a grid pitch for indicating a distance of a grid pattern in a constant area, the linear density of the pattern in the second sensor layer may be ranged from 60 to 80%.

Comparing the first sensor layer, the linear density of 20 to 40% is removed in the second sensor layer. The overlapped line is removed in the second sensor layer by applying three times of a grid pitch value.

Additionally, all of a sensor electrode and a dummy pattern D are formed in the first sensor layer, but only sensor electrode may be formed without the dummy pattern in the second sensor layer.

Like this, the pattern range and linear density of the first sensor layer positioned on an upper portion may be higher than those of the second layer positioned on a lower portion.

Through these structures, it is possible to solve visibility using significant difference of linear density. The linear density becomes lowed to minimize interference with the touch screen panel, and irregular patterns are formed to maximize visibility. Furthermore, yield can be increased by widening the range of agreement tolerance.

FIG. 12 is a cross-sectional view of a sensor electrode according to an embodiment of the present invention.

As shown in FIG. 12, the pattern of each of the connecting regions in which the first and second sensor layers intersected is shown. The pattern corresponding to the intersection connecting region may have thin line thickness.

That is, a direction of the pattern in the first sensor layer may cross at right angle as much as 90° with a direction of the pattern in the second sensor layer. The line thickness of the pattern positioned in the connecting region within the first and second sensor layers is formed thinner than the line thickness of the pattern positioned in the detection region, so that capacitance formed in the pattern of the connecting region can be reduced.

In this case, it is preferable that if the line thickness of the pattern in the detection region 7 μm, the line thickness of the pattern in the connecting region is under 3 μm to 4 μm.

Like this, by forming the line thickness of the pattern corresponding to the intersection connecting region, the specific gravity of fringing capacitance formed in a region in which the patterns are not overlapped each other, that is, the detection region becomes big as compared to capacitance formed in the pattern within the intersection connecting region. As a result, variation reduction is minimized to increase a rate of change.

At this time, the line width of the pattern in the first sensor layer is the same as that of the pattern in the second sensor layer, or the tolerance within ±2 μm can be reduce to prevent visibility degradation due to stack-up difference.

The line width as well as line thickness is able to have an effect to capacitance.

FIG. 13 shows a structure of a touch screen sensor according to an embodiment of the present invention.

As shown in FIG. 13, the touch screen sensor according to the present invention includes an upper substrate 110, a first electrode layer 120, a second electrode layer 130, and a lower substrate 140.

The first electrode layer 120 is formed on the upper substrate 110 to form a first sensor layer 10a, and the second electrode layer 130 is formed on the lower substrate 140 to form a second sensor layer 20a.

The first and second sensor layers 10a and 10b are laminated. The first electrode layer 120 formed on the first sensor layer 10a may be laminated looking downward, and the second electrode layer 130 formed on the second sensor layer 10b may be laminated looking upward. That is, the first electrode layer 120 in the first sensor layer 10a may be laminated with the second electrode layer 130 in the second sensor layer 10b to be faced each other.

For this, the pattern and structure of the first electrode layer looking downward should keep occurrence of abnormality in comparison with the pattern and structure looking upward.

By agreement of first and second electrode layers to be faced each other, visibility of the pattern formed in the first and second sensor layers can be minimized Also, a distance between electrodes formed on the upper and lower substrates 110 and 140 becomes shortened, and such the distance may have effect on capacitance.

FIG. 14 shows a structure of an image display device according to an embodiment of the present invention.

As shown in FIG. 14, the image display device according to the present invention comprises a substrate 100, a first electrode pattern 200, a second electrode pattern 200, a first signal line 300, a sensing IC 400, a driving IC 410, a second signal line 500, and a MCU (Micro Controller Unit) 600.

The sensing IC is connected through the first signal line 300 to a predetermined number of first electrode patterns 200 to receive a touch signal detected therein.

The driving IC 410 is connected through the first signal line 300 to a predetermined number of second electrode patterns 210 to input a touch signal detected therein.

At this time, since a signal transmitted through the first signal line 300 is an analog signal, as a length of the first signal line becomes longer, resistance and noise interference become increased. Accordingly, it is preferable that the sensing IC and the driving IC are arranged as closely as possible to an end of the electrode pattern.

That is, the length of each of the first and second electrode patterns 200 and 210, and the first and second signal lines connected between the sensing IC 400 and the driving IC 410 is formed as short as possible.

The sensing IC 400 is connected as one or more first electrode pattern unit to input an analog signal from the connected first electrode pattern and convert the inputted analog signal to a digital signal, and then transmit the converted digital signal through the second signal line 500 to the MCU 600.

The driving IC 410 is connected as one or more second electrode pattern unit to input an analog signal from the connected second electrode pattern and convert the inputted analog signal to a digital signal, and then transmit the converted digital signal through the second signal line 500 to the MCU 600.

At this time, the signal transmitted through the second signal line 500 may be a digital signal.

In this case, the sensing IC 400, the driving IC 410, and the second signal line 500 may be embedded in a bezel unit.

Through these structures, since the sensing IC and the driving IC are arranged as closely as possible to the end of the electrode pattern, the resistance value of the pattern and signal line may be used in conformal. As the length of the signal line is shortened, the noise interference and resistance can be reduced. If a response speed becomes high by reducing the noise and resistance in medium or large size panels, it is possible to secure a timing when more algorithm are applicable in a system.

FIG. 15 shows a form of a ground line according to another embodiment of the present invention.

As shown in FIG. 15, a ground line in a touch screen panel is formed in a line width the same as that of a signal line, but may be formed thick in a predetermined specific section. That is, the line width of the ground line in a predetermined specific section is broader than that of the signal line.

For example, since a predetermined-size space A is formed at sides of the signal lines and the ground line, the line width of the ground line is formed thick in this space A.

At this time, the line width of the ground line is set not to be interfered with other signal lines.

According to the present invention, through these structures, since a ground line or ground is designed at an empty space except for a space in which the signal lines are arranged, a function defect over-detection by edge-short is reduced to improve process yield and dramatically improve stability of panel tunning function as well as edge-touch function.

According to the present invention, the touch screen sensor, the touch screen panel, and the image display device thereof is capable of improving transmission, reducing Moire effect, and minimizing visibility of patterns in the capacitive-type touch screen panel forming electrode patterns using conductive materials.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. For instance, in some embodiment of the present invention, the patterns of the sensor electrodes are embossed in the sensor layer and conductive materials may be filled in the embossed pattern, but the patterns of the sensor electrodes may be engraved in the sensor layers.

All such changes, modifications, variations and other uses and applications which do not depart from the spirit and scope of the invention are deemed to be covered by the invention which is limited only by the claims which follow.

What is claimed is:

1. A touch screen panel comprising:
a first sensor layer including a plurality of first sensor electrodes for detecting a position of a touch input on one axis; and
a second sensor layer stacked on an upper part or a lower part of the first sensor layer and including a plurality of second sensor electrodes for detecting a position of the touch input on another axis,
wherein each of the first sensor electrodes includes first detection regions arranged in a zigzag manner along a first direction and first connection regions for connecting the first detection regions, each of the first detection regions including first sensing lines that cross each other, each of the first connection regions including first connection lines,
wherein each of the second sensor electrodes includes second detection regions arranged in a zigzag manner along a second direction and second connection regions for connecting the second detection regions, each of the second detection regions including second sensing lines that cross each other, each of the second connection regions including second connection lines,
wherein one or more of the first sensing lines respectively extend to one or more of the first connection lines,
wherein one or more of the second sensing lines respectively extend to one or more of the second connection lines, and
wherein the first connection lines overlap with and cross the second connection lines to form patterns.

2. The touch screen panel of claim 1, wherein electrode patterns of the first or second detection regions are different from electrode patterns of the first or second connection regions.

3. The touch screen panel of claim 1, wherein the first and second detection regions are not overlapped.

4. The touch screen panel of claim 1, wherein electrode patterns of the first detection regions are the same as electrode patterns of the second detection regions.

5. The touch screen panel of claim 1, wherein electrode patterns of the first detection regions are the same as electrode patterns of the second detection regions, and
wherein electrode patterns of the first and second connection regions are different from the electrode patterns of the first and second detection regions, and
wherein patterns of regions where the first and second connection regions are overlapped are the same as the electrode patterns of the first and second detection regions.

6. The touch screen panel of claim 1, wherein each of the electrode patterns of the first and second detection regions includes a grid pattern, and each of electrode patterns of the first and second connecting regions includes a straight-line pattern.

7. The touch screen panel of claim 6, wherein a straight-line direction of the straight-line pattern is in agreement with one direction of a straight line of the grid pattern.

8. The touch screen panel of claim 6, wherein the grid patterns of the first detection regions are not overlapped with the grid patterns of the second detection regions.

9. The touch screen panel of claim 6, wherein at least one straight-line pattern of the grid patterns of the first and second detection regions is in parallel with the straight-line patterns of the first or second connection regions, and
wherein at least one straight-line pattern of the grid patterns of the first and second detection regions is extended to be formed as the straight-line pattern of the electrode patterns of the first or second connection regions.

10. The touch screen panel of claim 6, wherein at least a portion of the straight-line pattern of the first connecting region and at least a portion of the straight-line pattern of the second connection regions overlap.

11. The touch screen panel of claim 10, wherein the overlapped portions of the straight-line patterns of the first and second connection regions include straight lines with different directions.

12. The touch screen panel of claim 10, wherein the grid patterns of the first and second detection regions are first grid patterns, and
wherein the straight-line patterns of the first and second connection regions overlap, the overlapped straight-line patterns being second grid patterns.

13. The touch screen panel of claim 12, wherein the second gird patterns are the same as the first grid patterns of the first and second connection regions.

14. The touch screen panel of claim 6, wherein the straight-line pattern includes a plurality of straight-lines.

15. The touch screen panel of claim 14, wherein a number of the straight-lines of the straight-line pattern is in a range from 3 to 5.

16. The touch screen panel of claim 1, wherein
a ratio of a pattern area within the first or second detection region to a pattern area within the first or second connection region is in a range from 4:1 to 5:1.

17. The touch screen panel of claim 1, wherein a linear density or an area density of a pattern within the first sensor layer is higher than a linear density or an area density of a pattern within the second sensor layer.

18. The touch screen panel of claim 1, wherein a line thickness of each of the first connection lines and the second connection lines is thinner than a line thickness of each of the first sensing lines and the second sensing lines.

19. The touch screen panel of claim 1, wherein the second sensor layer is laminated on the lower part of the first sensor layer, and
wherein the first sensor electrode of the first sensor layer and the second sensor electrode of the second sensor layer are laminated to face each other.

20. The touch screen panel of claim 1, wherein the first connection lines are respectively connected between two or more sensing lines of a first one of the first detection regions and two or more sensing lines of a second one of the first detection regions, and
wherein the second connection lines are respectively connected between two or more sensing lines of a first one of the second detection regions and two or more sensing lines of a second one of the second detection regions.

21. The touch screen panel of claim 1, wherein patterns of the first and second sensing lines or the first and second connection lines have straight-line shapes, curved-line shapes, irregular shapes, or combination thereof.

22. The touch screen panel of claim 1, wherein two neighboring detection regions among the first detection regions or the second detection regions are symmetric, and
wherein the two neighboring detection regions form an octagonal shape.

23. The touch screen panel of claim 1, wherein neighboring first connection lines are spaced apart by a first interval, and neighboring second connection lines are spaced apart by a second interval.

24. The touch screen panel of claim 1, wherein each of the one or more of the first sensing lines extends in a third direction, the third direction being the same direction as a direction in which each of the one or more of the first connection lines extends, and
   wherein each of the one or more of the second sensing lines extends in a fourth direction, the fourth direction being the same direction as a direction in which each of the one or more of the second connection lines extends.

25. The touch screen panel of claim 1, wherein each of electrode patterns of the first and second detection regions includes a grid pattern, and
   wherein the grid pattern is the same as each of the patterns in a region where the first connection lines overlap with the second connection lines.

* * * * *